US010120960B2

United States Patent
Inoue et al.

(10) Patent No.: US 10,120,960 B2
(45) Date of Patent: Nov. 6, 2018

(54) DEVICE ARRANGEMENT APPARATUS AND DEVICE ARRANGEMENT METHOD

(71) Applicant: Hitachi, Ltd., Chiyoda-ku, Tokyo (JP)

(72) Inventors: Reiko Inoue, Tokyo (JP); Takaharu Matsui, Tokyo (JP); Shinji Tanaka, Tokyo (JP); Kenji Kondo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 292 days.

(21) Appl. No.: 14/937,133

(22) Filed: Nov. 10, 2015

(65) Prior Publication Data
US 2016/0132615 A1 May 12, 2016

(30) Foreign Application Priority Data
Nov. 12, 2014 (JP) .................... 2014-229969

(51) Int. Cl.
*G06F 17/50* (2006.01)
*G06N 5/02* (2006.01)

(52) U.S. Cl.
CPC ............. *G06F 17/50* (2013.01); *G06N 5/025* (2013.01)

(58) Field of Classification Search
None
See application file for complete search history.

(56) References Cited

U.S. PATENT DOCUMENTS

| 8,525,849 B2 | 9/2013 | Nakamura et al. | |
| 8,760,426 B1 | 6/2014 | Strand et al. | |
| 2009/0106715 A1 | 4/2009 | Pikus | |
| 2011/0029098 A1* | 2/2011 | Fukuda | G05B 19/41885 700/13 |
| 2011/0225522 A1 | 9/2011 | Kamiyama et al. | |
| 2015/0205910 A1* | 7/2015 | Lindgren | G06F 17/5095 703/1 |
| 2016/0147919 A1* | 5/2016 | Yabe | H04L 12/2816 700/275 |

FOREIGN PATENT DOCUMENTS

JP 3394024 B2 4/2003

OTHER PUBLICATIONS

Hiroshi Yoshiura, "A Case-based Reasoning Method Using Partially Similar Cases by Decomposing Problems and Cases" IPSJ Journal vol. 32, No. 5, pp. 626-634, May 15, 1991, Information Processing Society of Japan (with a partial translation).

* cited by examiner

*Primary Examiner* — Syed Roni
(74) *Attorney, Agent, or Firm* — Crowell & Moring LLP

(57) ABSTRACT

A device arrangement rule generation unit generates device arrangement rules each including a past installation space of devices and relative direction information indicating a relative direction between devices that were arranged in the past installation space. An input unit inputs information on a new installation space and devices to be arranged in the new installation space. A device arrangement rule extraction unit extracts device arrangement rules each including the devices to be arranged in the new installation space input by the input unit. A device arrangement calculation unit calculates an arrangement position of the devices to be arranged in the new installation space based on relative direction information included in one of the device arrangement rules extracted by the device arrangement rule extraction unit and based on dimensions of the devices to be arranged in the new installation space input by the input unit.

8 Claims, 18 Drawing Sheets

Fig 6

| ARRANGEMENT DRAWING (19a) | DEVICE (19b) | DEVICE (19c) | DEVICE ARRANGEMENT RULE No. (19d) | ACTUAL INSTALLATION SPACE SPATIAL DIMENSIONS (x,y,z)(m) (19e) | RELATIVE POSITIONAL RELATIONSHIP UNIT VECTOR (x,y,z) (19f) |
|---|---|---|---|---|---|
| ARRANGEMENT_DRAWING_1.cad | DEVICE A | DEVICE B | AB-1 | (4.0, 3.0, 2.5) | (0.0,-1.0, 0.0) |
| ARRANGEMENT_DRAWING_1.cad | DEVICE A | DEVICE C | AC-1 | (4.0, 3.0, 2.5) | (-1.0, 0.0, 0.0) |
| ARRANGEMENT_DRAWING_1.cad | DEVICE A | DEVICE D | AD-1 | (4.0, 3.0, 2.5) | (0.0, 0.0, 1.0) |
| ARRANGEMENT_DRAWING_2.cad | DEVICE A | DEVICE G | AC-2 | (3.0, 4.0, 5.0) | (0.0, 1.0, 0.0) |
| ARRANGEMENT_DRAWING_2.cad | DEVICE A | DEVICE D | AD-2 | (3.0, 4.0, 5.0) | (0.0, 0.0, 1.0) |
| ARRANGEMENT_DRAWING_3.cad | DEVICE A | DEVICE B | AB-3 | (5.0, 5.0, 3.0) | (0.0,-1.0, 0.0) |
| ARRANGEMENT_DRAWING_3.cad | DEVICE A | DEVICE E | AE-3 | (5.0, 5.0, 3.0) | (1.0, 0.0, 0.0) |

| CASE NAME | MEMBER DEVICE | COMPONENT DRAWING | DEVICE ARRANGEMENT ORDER |
|---|---|---|---|
| CASE DDD | DEVICE A | COMPONENT_DRAWING_A.cad | 1 |
| CASE DDD | DEVICE B | COMPONENT_DRAWING_B.cad | 2 |
| CASE DDD | DEVICE C | COMPONENT_DRAWING_C.cad | 3 |
| CASE DDD | DEVICE E | COMPONENT_DRAWING_E.cad | 4 |

| DEVICE ARRANGEMENT RULE No. | DEVICE | DEVICE | ACTUAL INSTALLATION SPACE SPATIAL DIMENSIONS (x,y,z)(m) | NEW INSTALLATION SPACE SPATIAL DIMENSIONS (x,y,z)(m) | DIAGONAL VECTOR SIMILARITY DEGREE | PRIORITY |
|---|---|---|---|---|---|---|
| AB-1 | DEVICE A | DEVICE B | (4.0, 3.0, 2.5) | (4.0, 2.5, 2.0) | 0.915 | 1 |
| AB-3 | DEVICE A | DEVICE B | (5.0, 5.0, 3.0) | (4.0, 2.5, 2.0) | 0.897 | 2 |
| AC-1 | DEVICE A | DEVICE C | (4.0, 3.0, 2.5) | (4.0, 2.5, 2.0) | 0.915 | 1 |
| AC-2 | DEVICE A | DEVICE C | (3.0, 4.0, 5.0) | (4.0, 2.5, 2.0) | 0.857 | 2 |
| AE-3 | DEVICE A | DEVICE E | (5.0, 5.0, 3.0) | (4.0, 2.5, 2.0) | 0.897 | 1 |

Fig 13

| DEVICE 1 | DEVICE 2 | DEVICE ARRANGEMENT RULE No. | RELATIVE POSITIONAL RELATIONSHIP UNIT VECTOR (x,y,z) | DIMENSIONS OF DEVICE 1 (x,y,z)(m) | DIMENSIONS OF DEVICE 2 (x,y,z)(m) | RELATIVE ARRANGEMENT COORDINATES (x,y,z)(m) |
|---|---|---|---|---|---|---|
| DEVICE A | DEVICE C | AC-1 | (-1.0, 0.0, 0.0) | (3.0, 2.0, 6.0) | (1.6, 1.6, 6.0) | (-2.3, 0.0, 0.0) |
|  |  | AC-2 | (0.0, 1.0, 0.0) | (3.0, 2.0, 6.0) | (1.6, 1.6, 6.0) | (0.0, 1.8, 0.0) |

71a     71b

Fig 16
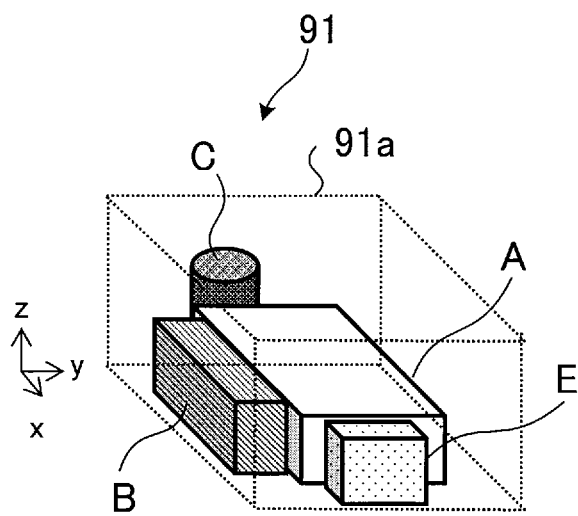
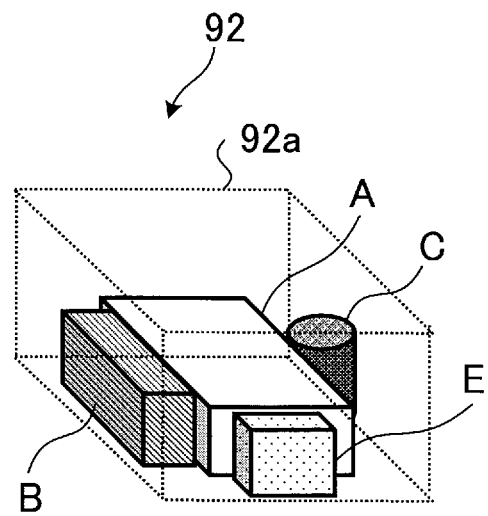

DEVICE ARRANGEMENT APPARATUS AND DEVICE ARRANGEMENT METHOD

BACKGROUND OF THE INVENTION

The present invention relates to a device arrangement apparatus and a device arrangement method. The present invention claims priority to Japanese Patent Application No. 2014-229969, filed on Nov. 12, 2014, the entire contents of which are incorporated herein by reference for the designated countries where incorporation of documents by reference is approved.

There is known Japanese Patent No. 3394024 as the related art. In Japanese Patent No. 3394024, there is disclosed "a device arrangement apparatus configured to optimally arrange a device or a device group in a predetermined arrangement space, including: an arrangement space input unit configured to input a device arrangement space; a constraint condition input unit configured to input a constraint condition relating to a device arrangement; an arrangement reference point generation unit configured to generate an arrangement reference point serving as a candidate for the device arrangement in the device arrangement space; and a device arrangement unit configured to determine arrangement coordinates of the device or the device group and generate an arrangement plan such that a predetermined evaluation criterion is optimized based on the constraint condition relating to the device arrangement input by the constraint condition input unit and the arrangement reference point generated by the arrangement reference point generation unit, the arrangement reference point generation unit including a first reference point generation unit configured to specify a corner portion of the device arrangement space or a corner portion of a subspace of the device arrangement space as the arrangement reference point and a second reference point generation unit configured to specify an intersection of reference lines formed based on the arrangement reference points generated by the first reference point generation unit as the arrangement reference point."

However, in Japanese Patent No. 3394024, there is a problem in that a user needs to input the constraint condition for the device arrangement when arranging devices, which requires a lot of labor.

SUMMARY OF THE INVENTION

Therefore, it is an object of the present invention to provide a technology for arranging devices without the need for a user to input a constraint condition for a device arrangement.

The present application includes a plurality of means for solving at least a part of the above-mentioned problem, and an example of the plurality of means is as follows. In order to solve the above-mentioned problem, according to one embodiment of the present invention, there is provided a device arrangement apparatus, including: an actual arrangement data storage unit configured to store past arrangement data of a device; a device arrangement rule generation unit configured to generate, by referring to the actual arrangement data storage unit, device arrangement rules each including a past installation space of devices and relative direction information indicating a relative direction between devices that were arranged in the past installation space; an input unit configured to input information on a new installation space and devices to be arranged in the new installation space, which is received from a user; a device arrangement rule extraction unit configured to extract, from among the device arrangement rules generated by the device arrangement rule generation unit, device arrangement rules each including a pair of devices among the devices to be arranged in the new installation space input by the input unit; and a device arrangement calculation unit configured to calculate an arrangement position of a pair of devices among the devices to be arranged in the new installation space based on relative direction information included in one of the device arrangement rules extracted by the device arrangement rule extraction unit and based on dimensions of the pair of devices among the devices to be arranged in the new installation space input by the input unit.

According to the one embodiment of the present invention, the devices are arranged without the user inputting the constraint condition for the device arrangement, and hence the user's labor can be saved. Problems, configurations, and effects other than those described above become apparent from the following description of embodiments.

BRIEF DESCRIPTION OF THE DRAWINGS

In the accompanying drawings:

FIG. 6 is a diagram for showing a data configuration example of a device arrangement rule storage unit 19.

FIG. 13 is a diagram for showing relative arrangement coordinates.

FIG. 16 is a view for illustrating a change of a device arrangement rule caused by interference.

DESCRIPTION OF THE PREFERRED EMBODIMENTS

In the following, a description is given of an embodiment of the present invention with reference to the drawings.

Figure 1:
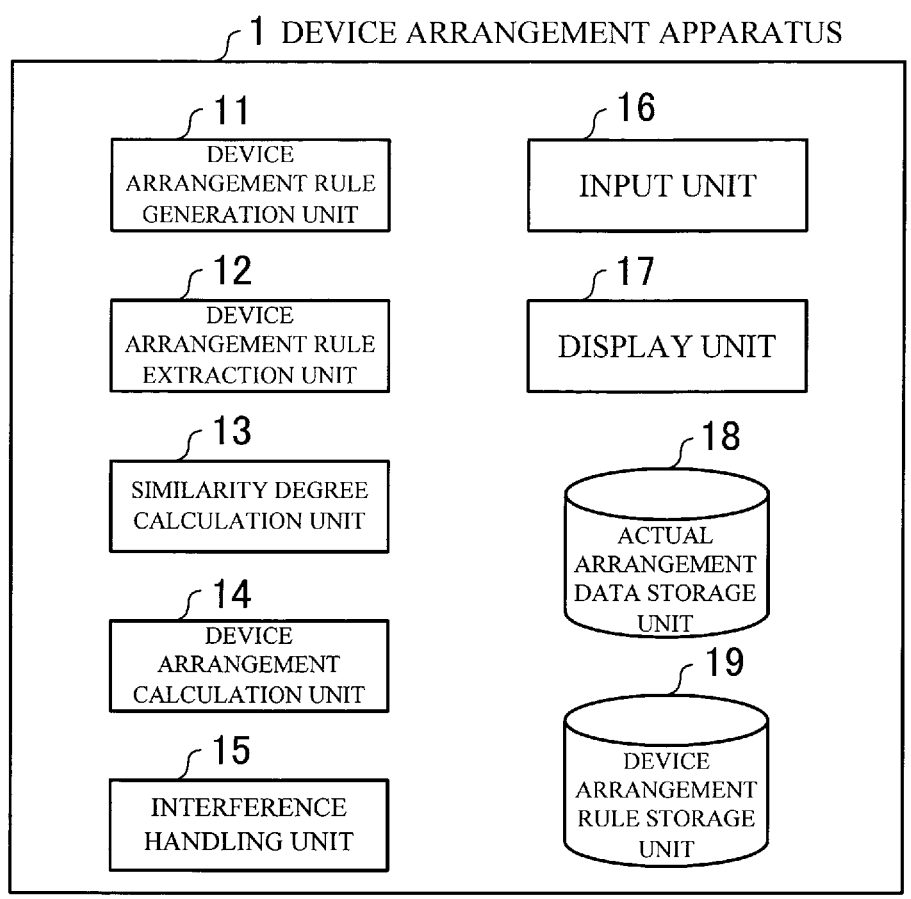
FIG. 1 is a diagram for illustrating an example of functional blocks of a device arrangement apparatus 1 according to the present invention.

FIG. 1 is a diagram for illustrating an example of functional blocks of a device arrangement apparatus 1 according to the present invention. The device arrangement apparatus 1 of FIG. 1 is implemented by an information processing apparatus such as a server or a personal computer (PC).

The device arrangement apparatus 1 receives from a user spatial dimensions of an installation space in which devices are to be arranged and information on devices that are to be arranged in the installation space. The installation space is, for example, a room in a building. The devices are, for example, power source devices or air-conditioning devices arranged in the room in the building.

The device arrangement apparatus 1 arranges devices received from the user in the installation space received from the user. In the device arrangement, the device arrangement apparatus 1 arranges the devices based on arrangement data, which is acquired through arrangement of the devices in the past, without, for example, receiving from the user a constraint condition such as at which position of the installation space which device is to be arranged.

As illustrated in FIG. 1, the device arrangement apparatus 1 includes a device arrangement rule generation unit 11, a device arrangement rule extraction unit 12, a similarity degree calculation unit 13, a device arrangement calculation unit 14, an interference handling unit 15, an input unit 16, a display unit 17, an actual arrangement data storage unit 18, and a device arrangement rule storage unit 19.

The device arrangement rule generation unit 11 refers to the actual arrangement data storage unit 18, which stores past arrangement data of devices, to generate information (device arrangement rule) including a past installation space of devices and relative direction information indicating a relative direction between devices that were arranged in that past installation space. The relative direction information indicating the relative direction between devices is represented by, for example, a unit vector.

The device arrangement rule extraction unit 12 extracts device arrangement rules each including devices to be arranged in a new installation space received by the input unit 16 from the user from among device arrangement rules generated by the device arrangement rule generation unit 11. The new installation space is an installation space in which the user attempts to arrange devices newly.

The similarity degree calculation unit 13 calculates similarity degrees between installation spaces included in the device arrangement rules extracted by the device arrangement rule extraction unit 12 and the new installation space received by the input unit 16 from the user.

The device arrangement calculation unit 14 selects a device arrangement rule from the device arrangement rules extracted by the device arrangement rule extraction unit 12. When selecting the device arrangement rule, the device arrangement calculation unit 14 selects a device arrangement rule having the highest similarity degree calculated by the similarity degree calculation unit 13. In other words, the device arrangement calculation unit 14 selects a device arrangement rule having an installation space similar to the new installation space input by the user. Then, the device arrangement calculation unit 14 calculates an arrangement position (relative arrangement coordinates) of the devices to be arranged in the new installation space based on the relative direction information included in the selected device arrangement rule and dimensions of the devices to be arranged in the new installation space received by the input unit 16 from the user.

The interference handling unit 15 determines whether or not at least one of the devices whose arrangement position has been calculated by the device arrangement calculation unit 14 and the new installation space received by the input unit 16 from the user interfere with each other. In other words, the interference handling unit 15 determines whether or not each of the devices whose arrangement position has been calculated by the device arrangement calculation unit 14 fits into the new installation space input by the user.

When the interference handling unit 15 determines that at least one of the devices whose arrangement position has been calculated and the new installation space received by the input unit 16 from the user interfere with each other, the device arrangement calculation unit 14 selects a device arrangement rule having the next highest similarity degree. Then, the device arrangement calculation unit 14 calculates the arrangement position of the devices to be arranged in the new installation space based on the relative direction information included in the newly selected device arrangement rule and the dimensions of the devices to be arranged in the new installation space received by the input unit 16 from the user.

On the other hand, when the interference handling unit 15 determines that each of the devices whose arrangement position has been calculated and the new installation space received by the input unit 16 from the user do not interfere with each other, the device arrangement calculation unit 14 establishes the calculated arrangement position.

The input unit 16 receives information from the user via, for example, an input device such as a keyboard or a mouse. The input device may be included in the device arrangement apparatus 1 or may be included in a terminal connected thereto via a network such as the Internet.

The display unit 17 outputs an arrangement result of the devices calculated by the device arrangement calculation unit 14 onto a display device. The display device may be included in the device arrangement apparatus 1 or may be included in a terminal connected thereto via a network such as the Internet.

The actual arrangement data storage unit 18 stores past arrangement data of the devices. In the following, the past arrangement data of devices stored in the actual arrangement data storage unit 18 is referred to as "actual arrangement data" in some cases.

Figure 2:
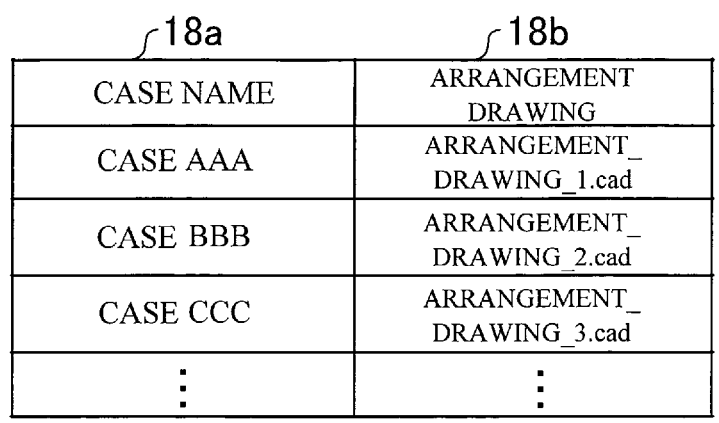
FIG. 2 is a diagram for showing a data configuration example of an actual arrangement data storage unit 18.

FIG. 2 is a diagram for showing a data configuration example of the actual arrangement data storage unit 18. As shown in FIG. 2, the actual arrangement data storage unit 18 stores actual arrangement data including a case name 18a and an arrangement drawing 18b.

The case name 18a indicates a name of a case in which devices were arranged in an installation space in the past.

The arrangement drawing 18b indicates a file name of an arrangement drawing in accordance with which devices were arranged in an installation space in the past. The data of the arrangement drawing 18b is, for example, computer aided design (CAD) data, and includes spatial dimensions (shape information of installation space) of an installation space in which devices were arranged, dimensions of the devices (shape information on device) arranged in the installation space, arrangement coordinate information on the devices, and information indicating an association relationship between the devices. Those pieces of information included in the arrangement drawing 18b can be extracted by, for example, CAD software, as necessary.

The actual arrangement data stored in the actual arrangement data storage unit 18 is received by the input unit 16 from the user in advance, and then stored in the actual arrangement data storage unit 18. In other cases, the device arrangement calculation unit 14 may store the calculated arrangement position of the devices into the actual arrangement data storage unit 18 as the actual arrangement data.

Figure 3:
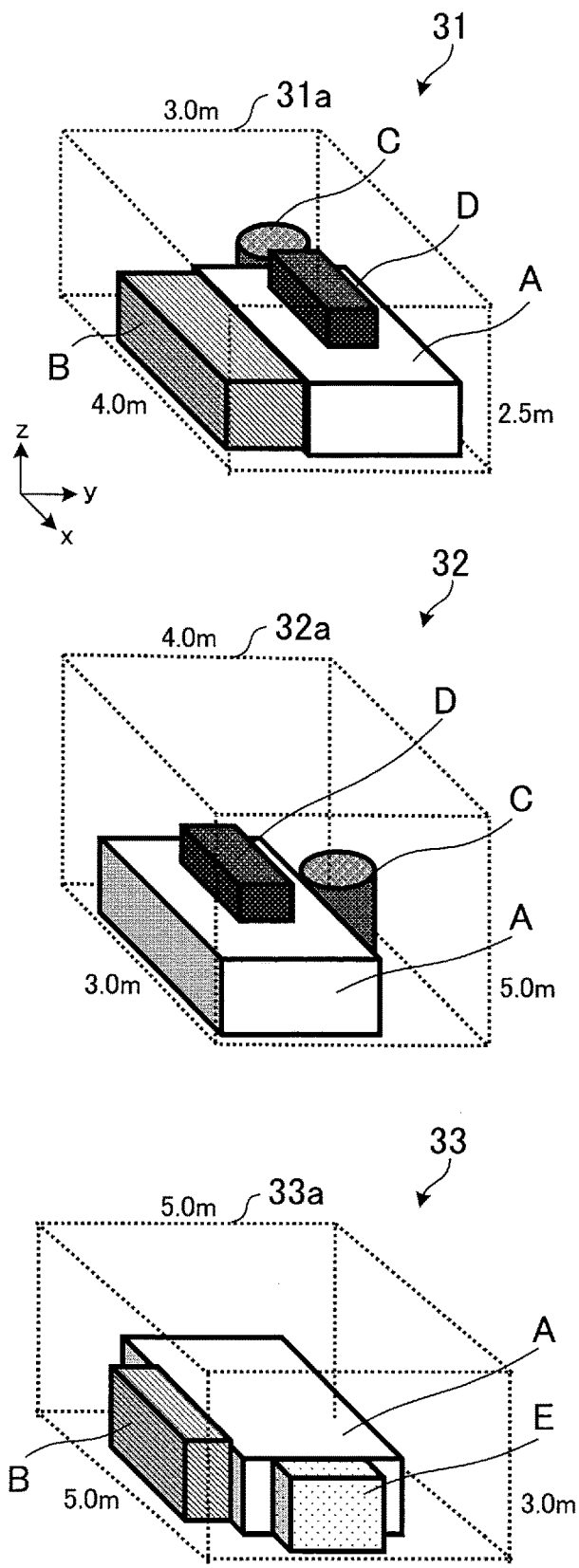
FIG. 3 is a view for illustrating an arrangement drawing 18b of FIG. 2.

FIG. 3 is a view for illustrating the arrangement drawing 18b of FIG. 2. When the data of the arrangement drawing 18b of FIG. 2 is visualized, the visualization is as illustrated in FIG. 3, for example.

An arrangement drawing 31 illustrated in FIG. 3 is illustrated as an example of visualizing "arrangement_drawing_1.cad" of the arrangement drawing 18b of FIG. 2. A broken line 31a shown in FIG. 3 indicates the installation space of "arrangement_drawing_1.cad" of FIG. 2. The spatial dimensions of the installation space of "arrangement_drawing_1.cad" are "4.0 m, 3.0 m, 2.5 m" in terms of length, width, and height, respectively. Devices A, B, C, and D are arranged in the installation space of "arrangement_drawing_1.cad" and in an association relationship as illustrated in FIG. 3 (device B is arranged to the left side of device A, device D is arranged on device A, and device C is arranged behind device A).

An arrangement drawing 32 illustrated in FIG. 3 is illustrated as an example of visualizing "arrangement_drawing_2.cad" of the arrangement drawing 18b of FIG. 2. A broken line 32a shown in FIG. 3 indicates the installation space of "arrangement_drawing_2.cad" of FIG. 2. The spatial dimensions of the installation space of "arrangement_drawing_2.cad" are "3.0 m, 4.0 m, 5.0 m" in terms of length, width, and height, respectively. The devices A, C, and D are arranged in the installation space of "arrangement_drawing_2.cad" and in an association relationship as illustrated in FIG. 3.

An arrangement drawing 33 illustrated in FIG. 3 is illustrated as an example of visualizing "arrangement_drawing_3.cad" of the arrangement drawing 18b of FIG. 2. A broken line 33a shown in FIG. 3 indicates the installation space of "arrangement_drawing_3.cad" of FIG. 2. The spatial dimensions of the installation space of "arrangement_drawing_3.cad" are "5.0 m, 5.0 m, 3.0 m" in terms of length, width, and height, respectively. The devices A, B, and E are arranged in the installation space of "arrangement_drawing_3.cad" and in an association relationship as illustrated in FIG. 3.

In short, "arrangement_drawing_1.cad", "arrangement_drawing_2.cad", and "arrangement_drawing_3.cad" of the arrangement drawing 18b shown in FIG. 2 contain such information as the spatial dimensions of the installation space, information on the member devices, and information on the association relationship as illustrated in FIG. 3.

Returning to the description of FIG. 1, the device arrangement rule storage unit 19 stores device arrangement rules generated by the device arrangement rule generation unit 11. A detailed description is given of the device arrangement rule storage unit 19 later.

In the following, a description is given of an operation of the device arrangement apparatus 1. The operation of the device arrangement apparatus 1 includes two phases. One of the phases is a "device arrangement rule generation phase" in which device arrangement rules are generated from actual arrangement data stored in the actual arrangement data storage unit 18. The other of the phases is a "new arrangement calculation phase" in which a new arrangement of devices is calculated based on the device arrangement rules generated in the "device arrangement rule generation phase" in response to a new arrangement request from the user. First, a description is given of the "device arrangement rule generation phase".

Figure 4:
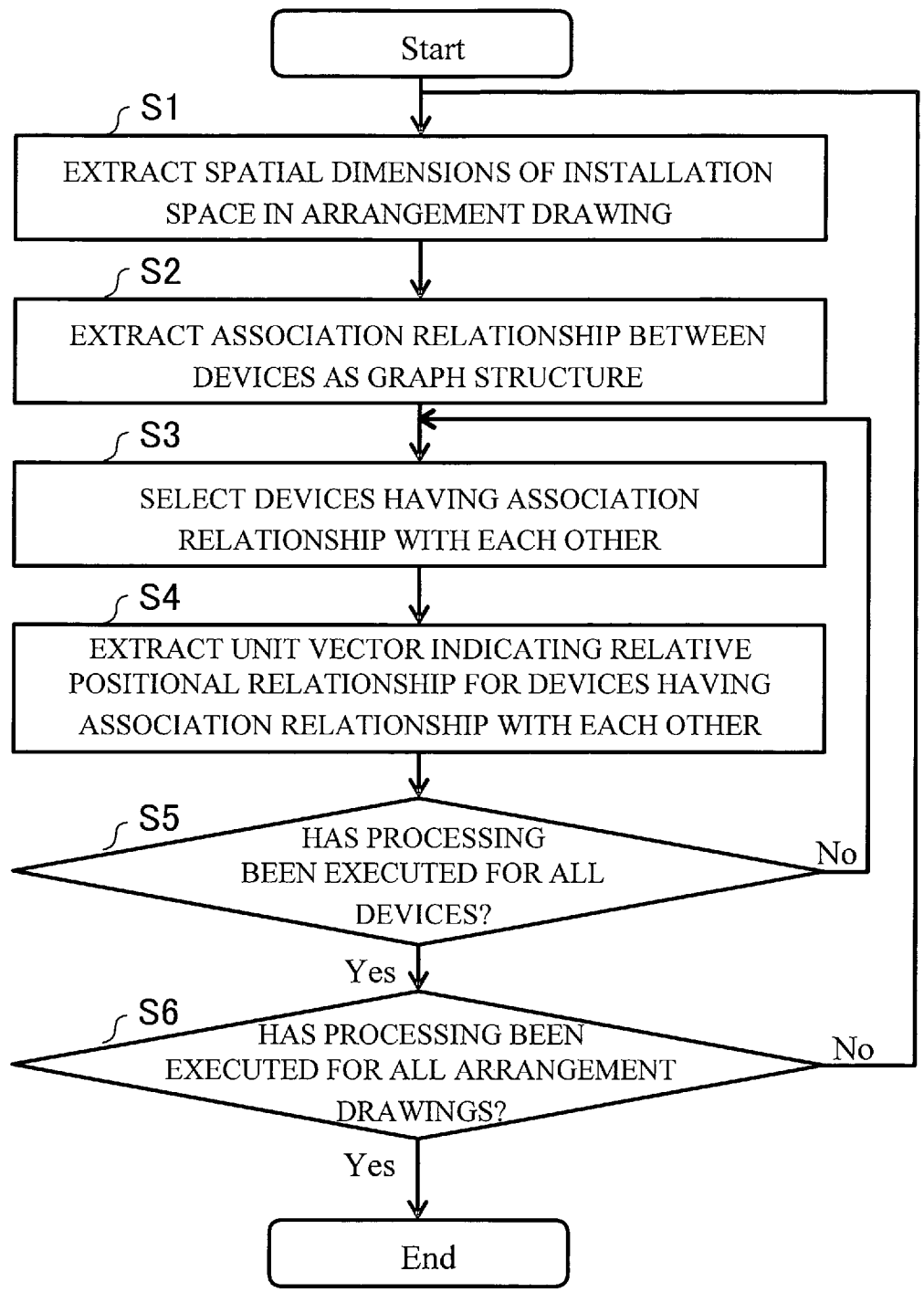
FIG. 4 is a flowchart for illustrating an operation example of device arrangement rule generation.

FIG. 4 is a flowchart for illustrating an operation example of the device arrangement rule generation. The device arrangement apparatus 1 starts the following processing of the flowchart periodically or in response to a request from the user. Note that, it is assumed that the actual arrangement data storage unit 18 stores the actual arrangement data corresponding to the case name 18a and the arrangement drawing 18b shown in FIG. 2.

First, the device arrangement rule generation unit 11 refers to the actual arrangement data storage unit 18 to select one piece of the actual arrangement data. Then, the device arrangement rule generation unit 11 extracts the spatial dimensions of the installation space from the arrangement drawing 18b of the selected piece of the actual arrangement data (Step S1).

For example, the device arrangement rule generation unit 11 selects "arrangement_drawing_1.cad" of "case AAA" shown in FIG. 2. Then, the device arrangement rule generation unit 11 extracts the spatial dimensions of the installation space of "arrangement_drawing_1.cad" from the selected "arrangement_drawing_1.cad". The spatial dimensions $(x_{s1}, y_{s1}, z_{s1})$ [m] of the installation space of "arrangement_drawing_1.cad" are (4.0, 3.0, 2.5) [m] as can be seen from, for example, FIG. 3, and hence the device arrangement rule generation unit 11 extracts (4.0, 3.0, 2.5) [m] as the spatial dimensions of the installation space of "arrangement_drawing_1.cad".

Next, the device arrangement rule generation unit 11 extracts the association relationship between devices included in the piece of actual arrangement data selected in Step S1 as a graph structure (Step S2).

For example, the device arrangement rule generation unit 11 extracts the graph structure of devices included in "arrangement_drawing_1.cad" from information indicating the association relationship between the devices of "arrangement_drawing_1.cad" selected in Step S1.

Figure 5:
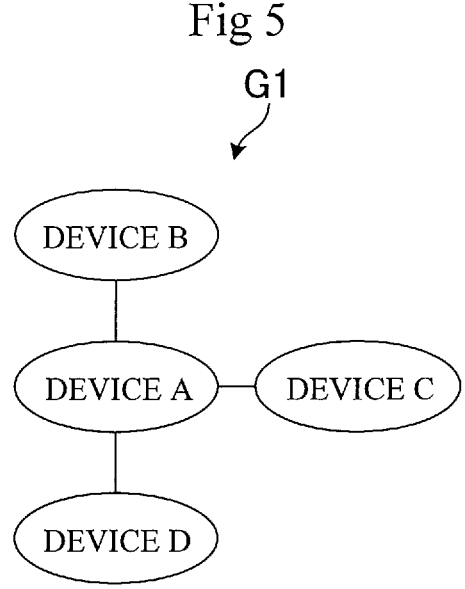
FIG. 5 is a diagram for illustrating a graph structure.

FIG. 5 is a diagram for illustrating the graph structure. In FIG. 5, a graph structure of the devices included in "arrangement_drawing_1.cad" is illustrated.

As illustrated in the arrangement drawing 31 of FIG. 3, "arrangement_drawing_1.cad" includes the devices A, B, C, and D, and the devices A, B, C, and D have an association relationship between the device A and the device B, an association relationship between the device A and the device C, and an association relationship between the device A and the device D as illustrated in the arrangement drawing 31. Thus, the device arrangement rule generation unit 11 extracts a graph structure G1 as illustrated in FIG. 5 in which the devices A to D are designated as nodes and the association relationships are designated as edges. The method of extracting the association relationships between devices is disclosed in, for example, Japanese Patent Laid-open Publication No. 2013-254269.

Returning to the description of the flowchart of FIG. 4, the device arrangement rule generation unit 11 next selects devices having an association relationship with each other based on the graph structure extracted in Step S2 (Step S3).

For example, in the case of the example of FIG. 5 (in case of actual arrangement data of "arrangement_drawing_1.cad"), the device A and the device B have an association relationship with each other, the device A and the device C have an association relationship with each other, and the device A and the device D have an association relationship with each other. Accordingly, in the case of the example of FIG. 5, the device arrangement rule generation unit 11 selects the device A and the device B, the device A and the device C, and the device A and the device D.

Next, the device arrangement rule generation unit 11 extracts a unit vector indicating a relative positional relationship (relative direction) for devices having an association relationship with each other that are selected in Step S3 (Step S4).

For example, the device arrangement rule generation unit 11 extracts a relative position between centers of gravity of devices having an association relationship with each other, and then extracts, from the extracted relative position between centers of gravity, a unit vector indicating a relative direction between the devices having an association relationship with each other.

Extraction of the unit vector between the device A and the device C, which are selected in Step S3, is specifically described. The device arrangement rule generation unit 11 extracts a vector between centers of gravity of the device A and the device C from "arrangement_drawing_1.cad". The vector between centers of gravity is represented as $(x_{AC1}, y_{AC1}, z_{AC1})=(-2.5, 0.0, 0.0)$. In this case, the device arrangement rule generation unit 11 extracts a unit vector $(x_{ACi1}, y_{ACi1}, z_{Aci1})=(-1.0, 0.0, 0.0)$ from the extracted vector between centers of gravity $(-2.5, 0.0, 0.0)$.

As described later, the device arrangement rule generation unit 11 extracts the unit vector indicating the relative direction between devices, to thereby be able to represent a relative positional relationship between the devices in a general manner even when the dimensions of the devices are changed.

Next, the device arrangement rule generation unit 11 determines whether or not the processing of Steps S3 and S4 has been executed for all the devices included in the arrangement drawing 18b of the piece of the actual arrangement data selected in Step S1 (Step S5).

For example, when the arrangement drawing 18b of the piece of the actual arrangement data is "arrangement_drawing_1.cad", the devices A, B, C, and D are included therein as illustrated in the arrangement drawing 31 of FIG. 3, and the device A and the device B, the device A and the device C, and the device A and the device D have an association relationship with each other, respectively. Accordingly, in this case, the device arrangement rule generation unit 11 determines whether or not the unit vector indicating the relative direction between the device A and the device B, the unit vector indicating the relative direction between the device A and the device C, and the unit vector indicating the relative direction between the device A and the device D have been extracted.

When determining that the unit vectors have not been calculated for all the devices ("No" in Step S5), the device arrangement rule generation unit 11 moves to the processing of Step S3. When determining that the unit vectors have been calculated for all the devices ("Yes" in Step S5), the device arrangement rule generation unit 11 moves to the processing of Step S6.

When determining in Step S5 that the unit vectors have been calculated for all the devices ("Yes" in Step S5), the device arrangement rule generation unit 11 determines whether or not the processing has been executed for all the arrangement drawings 18b (Step S6).

For example, the device arrangement rule generation unit 11 determines whether or not the unit vectors between devices have been calculated for all of "arrangement_drawing_1.cad", "arrangement_drawing_2.cad", and "arrangement_drawing_3.cad" shown in FIG. 2.

When determining that the processing has not been executed for all the arrangement drawings 18b ("No" in Step S6), the device arrangement rule generation unit 11 moves to the processing of Step S1. When determining that the processing has been executed for all the arrangement drawings 18b ("Yes" in Step S6), the device arrangement rule generation unit 11 ends the processing of this flowchart.

Through the processing described above, the device arrangement rule generation unit 11 generates the device arrangement rules each including the past installation space of devices and the unit vector indicating the relative direction between devices that were arranged in that past installation space. Then, the device arrangement rule generation unit 11 stores the generated device arrangement rules into the device arrangement rule storage unit 19.

FIG. 6 is a diagram for showing a data configuration example of the device arrangement rule storage unit 19. As shown in FIG. 6, the device arrangement rule storage unit 19 stores a device arrangement rule including an arrangement drawing 19a, devices 19b and 19c, a device arrangement rule No. 19d, actual installation space spatial dimensions 19e, and a relative positional relationship unit vector 19f.

The arrangement drawing 19a indicates a file name of an arrangement drawing in accordance with which devices were arranged in an installation space in the past.

The devices 19b and 19c indicate devices included in data of the corresponding arrangement drawing 19a and having an association relationship with each other.

For example, "arrangement_drawing_1.cad" shown in FIG. 6 has the association relationships between the device A and the device B, the device A and the device C, and the device A and the device D as illustrated in the arrangement drawing 31 of FIG. 3 or the graph structure of FIG. 5. Accordingly, the device A and the device B, the device A and the device C, and the device A and the device D are stored in the devices 19b and 19c corresponding to "arrangement_drawing_1.cad" of FIG. 6.

The device arrangement rule No. 19d is information for uniquely identifying the device arrangement rule. The device arrangement rule No. 19d is assigned by the device arrangement rule generation unit 11.

The actual installation space spatial dimensions 19e indicates the spatial dimensions of the installation space having the corresponding arrangement drawing 19a.

For example, the spatial dimensions of the installation space of "arrangement_drawing_1.cad" are "4.0 m, 3.0 m, 2.5 m" as illustrated in FIG. 3, and hence the actual installation space spatial dimensions 19e are (4.0, 3.0, 2.5) [m].

The relative positional relationship unit vector 19f indicates the relative direction between the devices 19b and 19c of the corresponding arrangement drawing 19a. For example, the relative positional relationship unit vector 19f indicates the association direction of the device 19c toward the device 19b.

For example, in the above-mentioned example of the flowchart of FIG. 4, (−1.0, 0.0, 0.0) is extracted as the unit vector between the device A and the device C of "arrangement_drawing_1.cad", and hence (−1.0, 0.0, 0.0) is stored in the relative positional relationship unit vector 19f corresponding to the device A and the device C of "arrangement_drawing_1.cad".

In the example of FIG. 6, there are two device arrangement rules about the device A and the device C, namely, the device arrangement rule having the device arrangement rule No. "AC-1" generated from "arrangement_drawing_1.cad" and the device arrangement rule having the device arrangement rule No. "AC-2" generated from "arrangement_drawing_2.cad". As described later, when, for example, the device arrangement calculation unit 14 calculates the relative arrangement coordinates of the device A and the device C in response to a new arrangement request of the devices from the user, the device arrangement calculation unit 14 selects one of the device arrangement rules having the device arrangement rule Nos. "AC-1" and "AC-2", and refers to the selected device arrangement rule to calculate the relative arrangement coordinates of the device A and the device C. Note that, the device arrangement rules having the device arrangement rule Nos. "AC-1" and "AC-2" are assigned priorities by the similarity degree calculation unit 13, and thus the device arrangement calculation unit 14 selects the device arrangement rule in descending order of priority.

Next, a description is given of the "new arrangement calculation phase". The device arrangement apparatus 1 calculates the arrangement position of devices in response to a new arrangement request of the devices from the user. In the arrangement position calculation, the device arrangement apparatus 1 calculates the new arrangement position of the devices using the device arrangement rules generated in the "device arrangement rule generation phase" without receiving from the user a constraint condition relating to the arrangement of the devices to be arranged newly.

Figure 7:
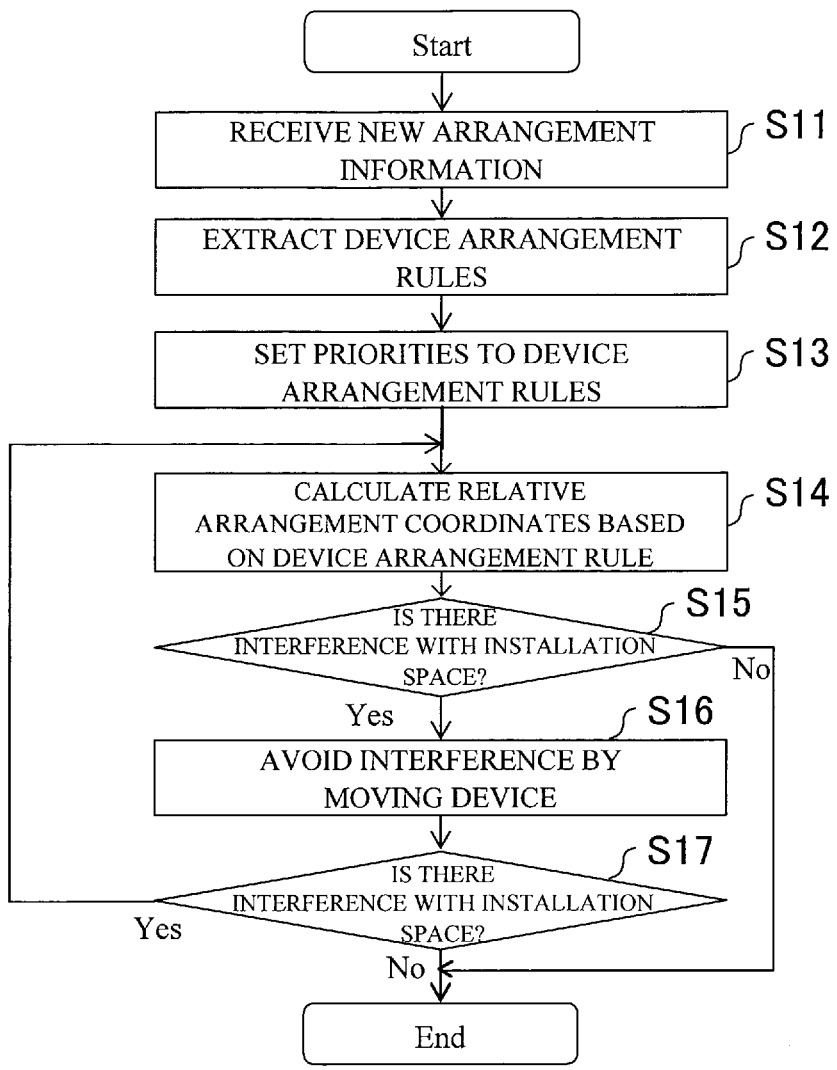
FIG. 7 is a flowchart for illustrating an operation example of a new arrangement calculation phase.

FIG. 7 is a flowchart for illustrating an operation example of the new arrangement calculation phase. The device arrangement apparatus 1 starts the following processing of the flowchart in response to a new device arrangement request from the user.

First, the input unit 16 receives new arrangement information from the user (Step S11). The input unit 16 stores the new arrangement information received from the user into the new arrangement information storage unit, which is not illustrated in FIG. 1.

Figure 8:
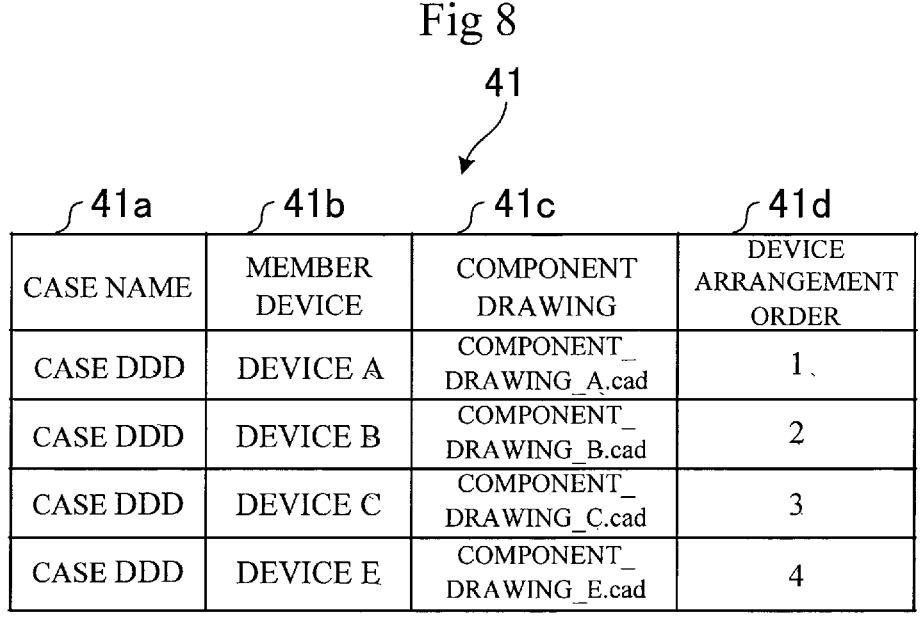
FIG. 8 is a diagram for showing a data configuration example of a new arrangement information storage unit 41.

FIG. 8 is a diagram for showing a data configuration example of the new arrangement information storage unit 41. As illustrated in FIG. 8, the new arrangement information storage unit 41 stores new arrangement information including a case name 41*a*, a member device 41*b*, a component drawing 41*c*, and a device arrangement order 41*d*.

The case name 41*a* indicates a name of a case in which the user carries out a new arrangement of devices.

The member device 41*b* indicates information on devices to be arranged in a new installation space by the user. For example, in the case of the example of FIG. 8, it can be seen that the user attempts to arrange the devices A, B, C, and E in the new installation space in a case having a case name "case DDD".

The component drawing 41*c* indicates a file name of a component drawing of the corresponding member device 41*b*. The data of the component drawing 41*c* is, for example, CAD data, and includes the dimensions of the device of the corresponding member device 41*b* and the spatial dimensions of the new installation space in which the device of the corresponding member device 41*b* is to be arranged.

Note that, the spatial dimensions of the new installation space may not be included in the component drawing 41*c*. In this case, the input unit 16 receives the spatial dimensions of the new installation space from the user in addition to the component drawing 41*c*. Then, the new arrangement information storage unit 41 prepares for an area for storing the spatial dimensions of the new installation space, and the input unit 16 stores the spatial dimensions of the new installation space received from the user into that area.

The device arrangement order 41*d* indicates an order in which devices are to be arranged in the new installation space included in the component drawing 41*c*.

Note that, the device arrangement order 41*d* is received by the input unit 16 from the user, and then stored in the new arrangement information storage unit 41, but the device arrangement calculation unit 14 may determine the arrangement order of devices. For example, the device arrangement calculation unit 14 may determine the device arrangement order 41*d* in descending order of the device size. In this case, the input unit 16 may not receive the device arrangement order 41*d* from the user.

Returning to the description of the flowchart of FIG. 7, the device arrangement rule extraction unit 12 next extracts device arrangement rules each including devices to be arranged in the new installation space, which are received by the input unit 16 from the user in Step S11, from among the device arrangement rules generated by the device arrangement rule generation unit 11 (Step S12). In other words, the device arrangement rule extraction unit 12 refers to the device arrangement rule storage unit 19 of FIG. 6 to extract the device arrangement rules each including devices of the member device 41*b* shown in FIG. 8.

For example, the devices A, B, C, and E are the devices to be arranged newly as shown in the member device 41*b* of FIG. 8. In this case, the device arrangement rule extraction unit 12 refers to the device arrangement rule storage unit 19 shown in FIG. 6 to extract the device arrangement rules having the device arrangement rule Nos. "AB-1", "AC-1", "AC-2", "AB-3", and "AE-3" each including a pair of devices among the devices A, B, C, and E.

Note that, the device D is not included in the devices to be arranged newly, and hence the device arrangement rule extraction unit 12 does not extract the device arrangement rules having the device arrangement rule Nos. "AD-1" and "AD-2" each including the device D.

Next, the similarity degree calculation unit 13 calculates similarity degrees between the installation spaces of the device arrangement rules extracted in Step S12 and the new installation space received by the input unit 16 from the user in Step S11. Then, the similarity degree calculation unit 13 sets priorities to the device arrangement rules extracted in Step S12 based on the calculated similarity degrees (Step S13). A detailed description is given of setting the priorities to the device arrangement rules in Step S13 later.

Next, the device arrangement calculation unit 14 selects one of the device arrangement rules extracted in Step S12 based on the priorities set in Step S13. Then, the device arrangement calculation unit 14 calculates relative arrangement coordinates of the devices based on the selected device arrangement rule (Step S14).

In other words, the device arrangement calculation unit 14 selects a device arrangement rule similar to the new installation space in which the user attempts to arrange devices newly, and calculates the relative arrangement coordinates of the devices based on the selected device arrangement rule. A detailed description is given of calculating the relative arrangement coordinates of the devices based on the device arrangement rule in Step S14 later.

Next, the interference handling unit 15 determines whether or not the new installation space received by the input unit 16 from the user and at least one of the devices arranged at the relative arrangement coordinates calculated in Step S14 interfere with each other (Step S15). In other words, the interference handling unit 15 determines whether or not each of the devices arranged at the relative arrangement coordinates calculated by the device arrangement calculation unit 14 fits into the new installation space.

When determining that the new installation space and at least one of the devices arranged at the relative arrangement coordinates interfere with each other ("Yes" in Step S15), the interference handling unit 15 moves to the processing of Step S16. When determining that the new installation space and each of the devices arranged at the relative arrangement coordinates do not interfere with each other ("No" in Step S15), the interference handling unit 15 ends the processing of this flowchart.

When the interference handling unit 15 determines in Step S15 that the new installation space and at least one of the devices arranged at the relative arrangement coordinates interfere with each other ("Yes" in Step S15), the device arrangement calculation unit 14 moves the at least one device arranged at the relative arrangement coordinates to avoid the interference (Step S16). A detailed description is given of the interference avoidance in Step S16 later.

Next, the interference handling unit 15 determines whether or not at least one of the devices arranged through the interference avoidance processing executed in Step S16 interferes with the new installation space (Step S17). When determining that at least one of the devices arranged through the interference avoidance processing executed in Step S16 interferes with the new installation space ("Yes" in Step S17), the interference handling unit 15 moves to the processing of Step S14. When determining that each of the devices arranged through the interference avoidance processing executed in Step S16 does not interfere with the new installation space ("No" in Step S17), the interference handling unit 15 ends the processing of this flowchart.

Note that, as described below, when the device arrangement calculation unit 14 moves to the processing of Step S14 after Step S17, the device arrangement calculation unit 14 selects a device arrangement rule having the next highest priority and calculates the relative arrangement coordinates of the devices.

Now, a description is given of setting the priorities to the device arrangement rules in Step S13 of FIG. 7.

Figure 9:
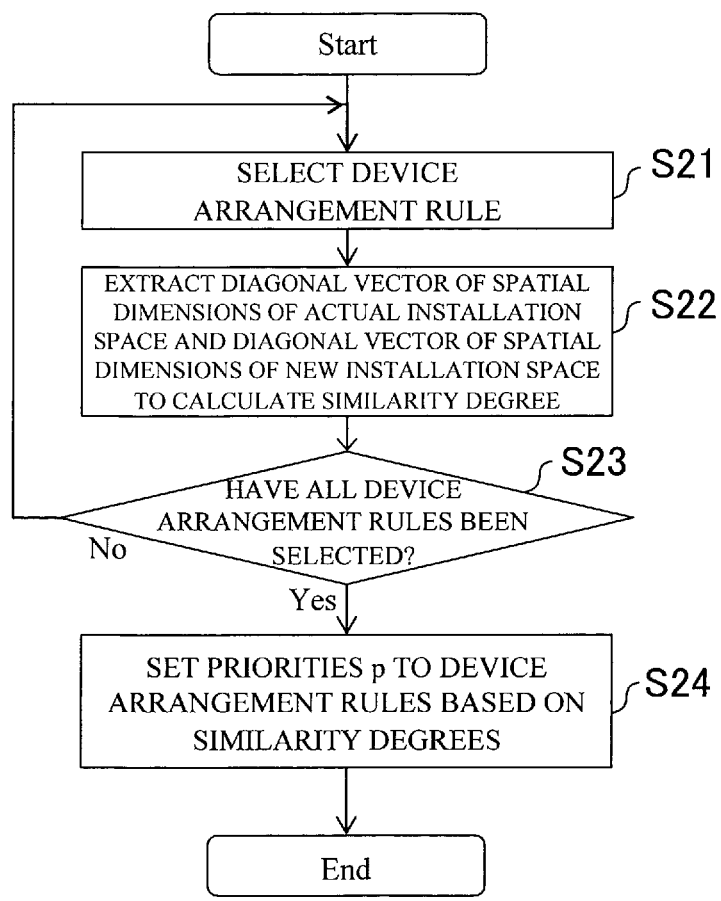
FIG. 9 is a flowchart for illustrating an operation example of priority setting processing of device arrangement rules.

FIG. 9 is a flowchart for illustrating an operation example of the priority setting processing of device arrangement rules. First, the similarity degree calculation unit 13 selects one of the device arrangement rules extracted in Step S12 of FIG. 7 (Step S21).

For example, as described in Step S12 of FIG. 7, the device arrangement rule extraction unit 12 extracts the device arrangement rules having the device arrangement rule Nos. "AB-1", "AC-1", "AC-2", "AB-3", and "AE-3". In this case, the similarity degree calculation unit 13 selects one device arrangement rule from among the device arrangement rules having the device arrangement rule Nos. "AB-1", "AC-1", "AC-2", "AB-3", and "AE-3".

Next, the similarity degree calculation unit 13 calculates a similarity degree between the new installation space received by the input unit 16 from the user and the installation space of the device arrangement rule selected in Step S21 based on a diagonal vector of the new installation space and a diagonal vector of the installation space of the device arrangement rule (Step S22).

Figure 10:
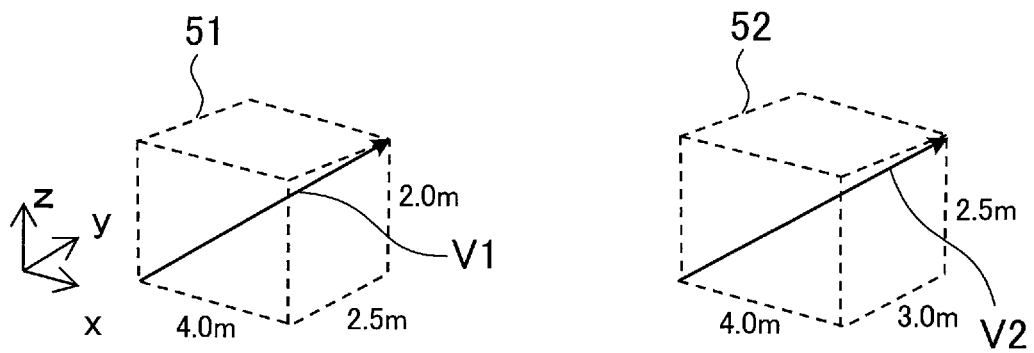
FIG. 10 is a view for illustrating a similarity degree calculation.

FIG. 10 is a view for illustrating the similarity degree calculation. A broken line 51 illustrated in FIG. 10 indicates the new installation space received by the input unit 16 from the user. A vector V1 indicates the diagonal vector of the new installation space indicated by the broken line 51.

A broken line 52 indicates the installation space in a case where the similarity degree calculation unit 13 selects the device arrangement rule having the device arrangement rule No. "AB-1" in Step S21. A vector V2 indicates the diagonal vector of the installation space indicated by the broken line 52.

The similarity degree calculation unit 13 can acquire the vector V1 based on the spatial dimensions of the new installation space received by the input unit 16 from the user. Further, the similarity degree calculation unit 13 can acquire the vector V2 based on the spatial dimensions of the installation space of the device arrangement rule No. "AB-1". Then, the similarity degree calculation unit 13 calculates a similarity degree D between the new installation space and the installation space of the device arrangement rule based on Expression (1).

$$\text{Similarity Degree } D = \alpha \cos \theta / \beta Ld \qquad (1)$$

"θ" in Expression (1) denotes an angle formed by the vector V1 and the vector V2. "Ld" denotes a magnitude of difference between the magnitude of the vector V1 and the magnitude of the vector V2, and is represented by Expression (2).

$$Ld = |(|V1| - |V2|)| \qquad (2)$$

"α" and "β" denote a weighting factor of the angle formed by the vector V1 and the vector V2 and a weighting factor of the magnitudes of the vector V1 and the vector V2, respectively. For example, "α=1" and "β=1" are conceivable.

As the magnitude of the vector V1 and the magnitude of the vector V2 get closer, "Ld" in Expression (1) approaches "0". Further, as the angle formed by the vector V1 and the vector V2 becomes smaller, "cos θ" in Expression (1) approaches "1".

On the other hand, as the magnitude of the vector V1 and the magnitude of the vector V2 differ from each other more greatly, "Ld" in Expression (1) takes a larger value. Further, as the angle formed by the vector V1 and the vector V2 becomes larger, "cos θ" in Expression (1) approaches "−1".

Therefore, when the vector V1 and the vector V2 are similar to each other, the similarity degree D represented by Expression (1) is large. In other words, when the vector V1 and the vector V2 illustrated in FIG. 10 are similar to each other, it is determined that the new installation space indicated by the broken line 51 and the installation space of the device arrangement rule having the device arrangement rule No. "AB-1" indicated by the broken line 52 are similar to each other.

Returning to the description of the flowchart of FIG. 9, the similarity degree calculation unit 13 determines whether or not all of the device arrangement rules extracted in Step S12 of FIG. 7 have been selected in Step S21 (Step S23). For example, the similarity degree calculation unit 13 determines whether or not the similarity degree calculation unit 13 has selected in Step S21 all of the device arrangement rules having the device arrangement rule Nos. "AB-1", "AC-1", "AC-2", "AB-3", and "AE-3" extracted by the device arrangement rule extraction unit 12.

When determining that not all of the device arrangement rules extracted in Step S12 of FIG. 7 have been selected in Step S21 ("No" in Step S23), the similarity degree calculation unit 13 moves to the processing of Step S21. When the similarity degree calculation unit 13 moves from Step S23 to Step S21, the similarity degree calculation unit 13 selects an unselected device arrangement rule.

When determining that all of the device arrangement rules extracted in Step S12 of FIG. 7 have been selected in Step S21 ("Yes" in Step S23), the similarity degree calculation unit 13 moves to the processing of Step S24. In other words, when the similarity degree calculation unit 13 has calculated the similarity degrees for all of the device arrangement rules extracted in Step S12 of FIG. 7, the similarity degree calculation unit 13 moves to the processing of Step S24.

When the similarity degree calculation unit 13 determines in Step S23 that all of the device arrangement rules extracted in Step S12 of FIG. 7 have been selected ("Yes" in Step S23), the similarity degree calculation unit 13 sets priorities to the device arrangement rules extracted in Step S12 based on the similarity degrees calculated in Step 22 (Step S24).

For example, the similarity degree calculation unit 13 sets the priorities such that a device arrangement rule extracted in Step S12 that has a higher similarity degree calculated in Step S22 has a higher priority.

After setting the priorities to the device arrangement rules, the similarity degree calculation unit 13 generates applicable device arrangement rules each including the similarity degree calculated in Step S22 and the priority set in Step S24. The similarity degree calculation unit 13 stores the generated applicable device arrangement rules into an applicable device arrangement rule storage unit, which is not illustrated in FIG. 1, and ends the processing of this flowchart.

Figure 11:
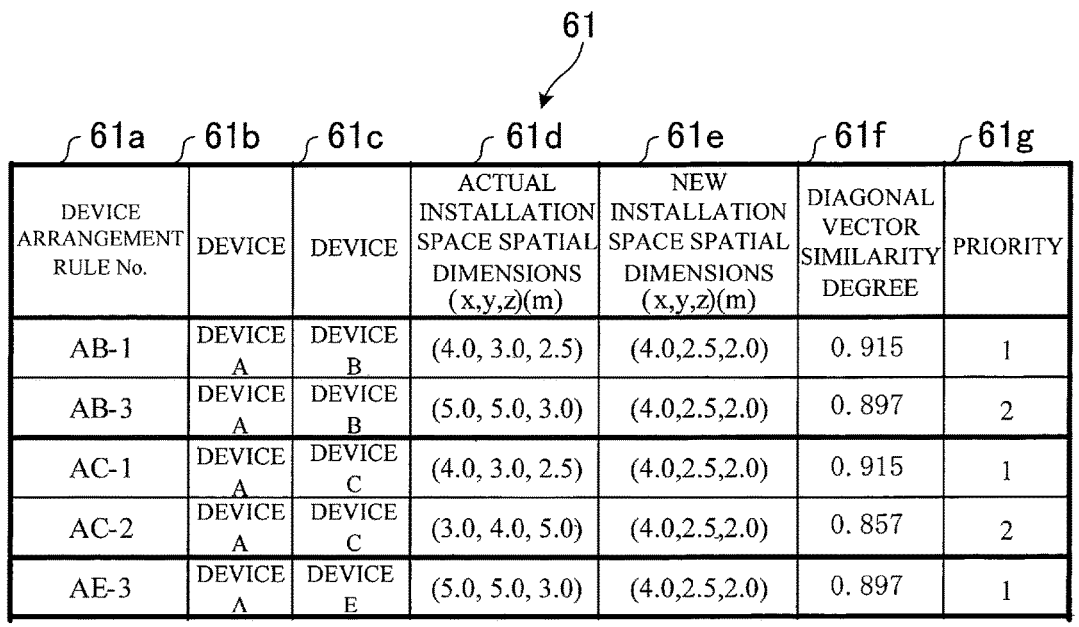
FIG. 11 is a diagram for showing a data configuration example of an applicable device arrangement rule storage unit 61.

FIG. 11 is a diagram for showing a data configuration example of the applicable device arrangement rule storage unit 61. As shown in FIG. 11, the applicable device arrangement rule storage unit 61 stores applicable device arrangement rules each including a device arrangement rule No. 61a, devices 61b and 61c, actual installation space spatial dimensions 61d, new installation space spatial dimensions 61e, a diagonal vector similarity degree 61f, and a priority 61g.

The device arrangement rule No. 61a is identification information of the device arrangement rule extracted by the device arrangement rule extraction unit 12.

For example, in the example of Step S12 of FIG. 7, the device arrangement rule extraction unit 12 extracts the device arrangement rules having the device arrangement rule Nos. "AB-1", "AB-3", "AC-1", "AC-2", and "AE-3". Accordingly, "AB-1", "AB-3", "AC-1", "AC-2", and "AE-3" are stored in the device arrangement rule No. 61a of FIG. 11.

The devices 61b and 61c are information on devices indicated by the device arrangement rule having the corresponding device arrangement rule No. 61a.

For example, in the case of the example of FIG. 11, it can be seen from the devices 61b and 61c that the device arrangement rule having the device arrangement rule No. "AC-1" is the one about the device A and the device C. Further, it can be seen from the devices 61b and 61c that the device arrangement rule having the device arrangement rule No. "AC-2" is also the one about the device A and the device C.

The actual installation space spatial dimensions 61d indicate the spatial dimensions of the installation space of the device arrangement rule having the corresponding device arrangement rule No. 61a. The similarity degree calculation unit 13 refers to the device arrangement rule storage unit 19 described with reference to FIG. 6 to acquire the actual installation space spatial dimensions 61d corresponding to the device arrangement rule No. 61a.

The new installation space spatial dimensions 61e indicate the spatial dimensions of the new installation space for which the user issues a new arrangement request of devices.

The diagonal vector similarity degree 61f indicates the similarity degree between the diagonal vector of the new installation space and the diagonal vector of the installation space of the device arrangement rule having the corresponding device arrangement rule No. 61a. The diagonal vector similarity degree 61f is acquired in Step S22 of FIG. 9.

The priority 61g is an indicator used when the device arrangement calculation unit 14 described later selects a device arrangement rule. The priority 61g is set by the similarity degree calculation unit 13 in Step S24 of FIG. 9.

For example, in the case of the example of FIG. 11, there are two device arrangement rules about the device A and the device C, namely, the device arrangement rules having the device arrangement rule Nos. "AC-1" and "AC-2". The device arrangement rule having the device arrangement rule No. "AC-1" has a priority of "1" whereas the device arrangement rule having the device arrangement rule No. "AC-2" has a priority of "2". As described later, when the device arrangement calculation unit 14 calculates relative arrangement coordinates of the device A and the device C in response to a new arrangement request from the user, the device arrangement calculation unit 14 selects the device arrangement rule having the device arrangement rule No. "AC-1", which has a higher priority, and calculates the relative arrangement coordinates of the device A and the device C.

Now, a description is given of calculating the relative arrangement coordinates of devices based on the device arrangement rule in Step S14 of FIG. 7.

Figure 12:
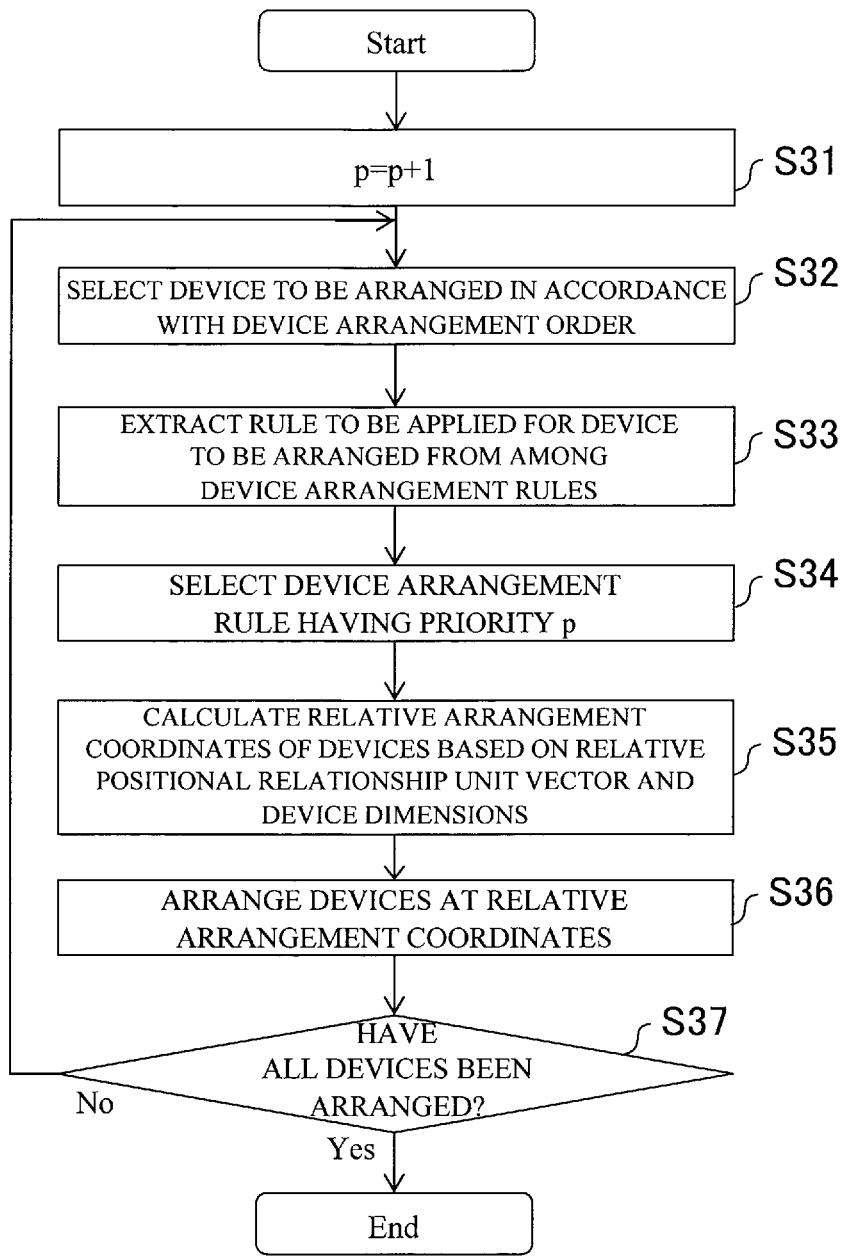
FIG. 12 is a diagram for illustrating an operation example of relative arrangement coordinate calculation processing of devices based on the device arrangement rules.

FIG. 12 is a diagram for illustrating an operation example of the relative arrangement coordinates calculation processing of devices based on the device arrangement rules. First, the device arrangement calculation unit 14 computes "p=p+1" for a variable p having an initial value of "0" (Step S31).

Note that, when the interference handling unit 15 determines in Step S17 of FIG. 7 that the new installation space and at least one of the devices arranged at the relative arrangement coordinates calculated by the device arrangement calculation unit 14 interfere with each other ("Yes" in Step S17), "1" is added to the variable p. Because of this, the value of the priority p described in the following Step S34 increases by "1".

Next, the device arrangement calculation unit 14 refers to the device arrangement order 41d of the new arrangement information storage unit 41 of FIG. 8 to select a device to be arranged in the new installation space (Step S32).

For example, when executing the processing of Step S32 for the first time, the device arrangement calculation unit 14 selects the device A, which has the highest device arrangement order 41d. Further, when executing the processing of Step S32 after the processing of Step S37, the device arrangement calculation unit 14 selects the device B, which has the next highest device arrangement order 41d behind the device A.

Next, the device arrangement calculation unit 14 refers to the applicable device arrangement rule storage unit 61 to extract device arrangement rules each including the device selected in Step S32 from among the applicable device arrangement rules stored in this storage unit (Step S33).

For example, the device arrangement calculation unit 14 selects the device A in Step S32. In this case, the device arrangement calculation unit 14 extracts the device arrangement rules having the device arrangement rule Nos. "AB-1", "AB-3", "AC-1", "AC-2", and "AE-3" from the applicable device arrangement rule storage unit 61 of FIG. 11.

Next, the device arrangement calculation unit 14 selects a device arrangement rule having the priority p from among the device arrangement rules extracted in Step S33 (Step S34).

For example, when the priority p is "1", the device arrangement calculation unit 14 selects the device arrangement rule having the device arrangement rule No. "AB-1" from among the device arrangement rules having the device arrangement rule Nos. "AB-1" and "AB-3". Further, the device arrangement calculation unit 14 selects the device arrangement rule having the device arrangement rule No. "AC-1" from among the device arrangement rules having the device arrangement rule Nos. "AC-1" and "AC-2". Further, the device arrangement calculation unit 14 selects the device arrangement rule having the device arrangement rule No. "AE-3".

Note that, when the interference handling unit 15 determines in Step S17 of FIG. 7 that the new installation space and at least one of the devices arranged at the relative arrangement coordinates interfere with each other ("Yes" in Step S17), the device arrangement calculation unit 14 executes the processing of Step S34 again. In this case, the device arrangement calculation unit 14 selects the device arrangement rule having the next highest priority (p=2) for the at least one device interfering with the new installation space.

For example, the device C arranged in accordance with the device arrangement rule having the device arrangement rule No. "AC-1" with a priority of "1" interferes with the new installation space. In this case, the device arrangement calculation unit 14 selects the device arrangement rules having the device arrangement rule Nos. "AB-1" and "AE-3" with priorities of "1" for the devices A, B, and E whereas the device arrangement calculation unit 14 selects the device arrangement rule having the device arrangement rule No. "AC-2" with a priority of "2", which is the next highest priority, for the device C interfering with the new installation space.

Next, the device arrangement calculation unit 14 acquires a relative positional relationship unit vector and dimensions of the devices based on the device arrangement rule selected in Step S34 and calculates the relative arrangement coordinates of the devices (Step S35).

For example, the device arrangement calculation unit 14 selects the device arrangement rules having the device arrangement rule Nos. "AB-1", "AC-1", and "AE-3" in Step S34. The device arrangement calculation unit 14 refers to the device arrangement rule storage unit 19 of FIG. 6 using the selected device arrangement rules, to thereby acquire the relative positional relationship unit vectors 19$f$ corresponding to the device arrangement rule Nos. "AB-1", "AC-1", and "AE-3". Further, the device arrangement calculation unit 14 refers to the component drawing 41$c$ of the new arrangement information storage unit 41 of FIG. 8 using the selected device arrangement rules, to thereby acquire the dimensions of the devices A, B, C, and E. Then, the device arrangement calculation unit 14 calculates, based on the acquired relative positional relationship unit vectors 19$f$ and the dimensions of the devices A, B, C, and E, the relative arrangement coordinates of the device A and the device B, the relative arrangement coordinates of the device A and the device C, and the relative arrangement coordinates of the device A and the device E.

Now, a description is given of an example of calculating the relative arrangement coordinates of the device A and the device C. The relative positional relationship unit vector $(x_{ACi1}, y_{ACi1}, z_{ACi1})$ corresponding to the device arrangement rule No. "AC-1" takes the following value as shown in FIG. 6.

$$(x_{ACi1}, y_{ACi1}, z_{ACi1}) = (-1.0, 0.0, 0.0)$$

Further, it is assumed that the dimensions $(x_{A1}, y_{A1}, z_{A1})$ of the device A and the dimensions $(x_{C1}, Y_{C1}, z_{C1})$ of the device C, which are acquired from the component drawing 41$c$ of the new arrangement information storage unit 41 of FIG. 8, take the following values, respectively.

$$(x_{A1}, y_{A1}, z_{A1}) = (3.0, 2.0, 6.0) \ [m]$$

$$(x_{C1}, Y_{C1}, z_{C1}) = (1.6, 1.6, 6.0) \ [m]$$

When respective centers of gravity of the device A and the device C are taken as reference positions of the relative positional relationship, the relative arrangement coordinates of the device A and the device C can be calculated in accordance with the following expression.

$$(x_{p1}, y_{p1}, z_{p1}) = \{(x_{A1}, y_{A1}, z_{A1}) + (x_{C1}, y_{C1}, z_{C1})\}/2 \cdot (x_{ACi1}, y_{ACi1}, z_{ACi1}) = (-2.3, 0.0, 0.0)$$

The device arrangement calculation unit 14 calculates the respective relative arrangement coordinates of the device A and the device B and of the device A and the device E in the same manner.

In short, the device arrangement calculation unit 14 calculates the relative arrangement coordinates of devices by using the unit vector indicating the relative direction between the devices held by the device arrangement rule in consideration of the actual sizes of the devices to be arranged newly. With this, the device arrangement calculation unit 14 can calculate the relative arrangement coordinates of devices even when the dimensions of the devices are changed.

FIG. 13 is a diagram for showing the relative arrangement coordinates. In FIG. 13, an example of relative arrangement coordinates 71$a$ of the device A and the device C, which is calculated in accordance with the device arrangement rule having the device arrangement rule No. "AC-1", and an example of relative arrangement coordinates 71$b$ of the device A and the device C, which is calculated in accordance with the device arrangement rule having the device arrangement rule No. "AC-2", are shown.

The relative arrangement coordinates 71$a$ of the device A and the device C, which is calculated in accordance with the device arrangement rule having the device arrangement rule No. "AC-1", is (−2.3, 0.0, 0.0). The relative arrangement coordinates 71$b$ of the device A and the device C, which is calculated in accordance with the device arrangement rule having the device arrangement rule No. "AC-2", is (0.0, 1.8, 0.0).

Figure 14:
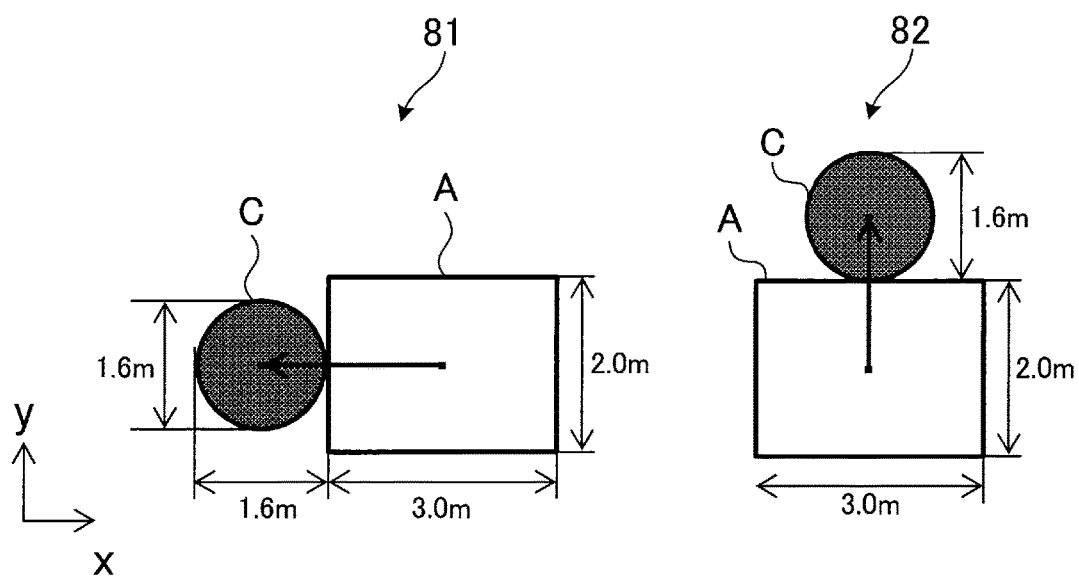
FIG. 14 is a view for illustrating an arrangement of a device A and a device C based on the relative arrangement coordinates of FIG. 13.

FIG. 14 is a view for illustrating an arrangement of the device A and the device C based on the relative arrangement coordinates of FIG. 13. An arrangement 81 illustrated in FIG. 14 represents the arrangement of the device A and the device C based on the relative arrangement coordinates 71$a$ of FIG. 13. An arrangement 82 represents the arrangement of the device A and the device C based on the relative arrangement coordinates 71$b$ of FIG. 13.

When the device C is arranged based on the device arrangement rule having the device arrangement rule No. "AC-1", the device C is arranged in "−x direction" (x=−2.3) of the device A as represented by the arrangement 81. Further, when the device C is arranged based on the device arrangement rule having the device arrangement rule No.

"AC-2", the device C is arranged in "+y direction" (y=1.8) of the device A as represented by the arrangement 82.

Returning to the description of the flowchart of FIG. 12, the device arrangement calculation unit 14 next arranges the devices based on the relative arrangement coordinates calculated in Step S35 (Step S36).

Next, the device arrangement calculation unit 14 calculates the relative arrangement coordinates for all the devices, and determines whether or not all the devices have been arranged at the calculated relative arrangement coordinates (Step S37).

When determining that all the devices have been arranged ("Yes" in Step S37), the device arrangement calculation unit 14 ends the processing of this flowchart. Note that, as in the above-mentioned example, when the device arrangement calculation unit 14 selects the device arrangement rules having the device arrangement rule Nos. "AB-1", "AC-1", and "AE-3" in Step S34, the relative arrangement coordinates are calculated for all the devices A, B, C, and E, and then those devices are arranged. In other words, all the devices A, B, C, and E for which the user issues a new arrangement request are arranged by the device arrangement calculation unit 14 at the calculated relative arrangement coordinates.

On the other hand, when determining that not all the devices have been arranged ("No" in Step S37), the device arrangement calculation unit 14 moves to the processing of Step S32. Then, the device arrangement calculation unit 14 selects a device having the next highest device arrangement order 41d (for example, device B) in Step S32, and extracts and selects device arrangement rules each including the selected device to calculate the relative arrangement coordinates. With this, the device arrangement calculation unit 14 can calculate the relative arrangement coordinates of devices based on a combination excluding the device A, such as the device arrangement rule about the device B and the device C.

For example, assuming that the device arrangement rules Nos "AC-1", "AE-3", and "BC-1" are stored in the applicable device arrangement rule storage unit 61 of FIG. 11, the device arrangement calculation unit 14 first calculates the relative arrangement coordinates of the device A and the device C and of the device A and the device E to arrange the devices A, C, and E. Next, the device arrangement calculation unit 14 calculates the relative arrangement coordinates of the device B and the device C, which is one of the combinations excluding the device A, to arrange the device B (arrange device B with respect to device C).

Now, a description is given of the interference avoidance in Step S16 of FIG. 7.

Figure 15:
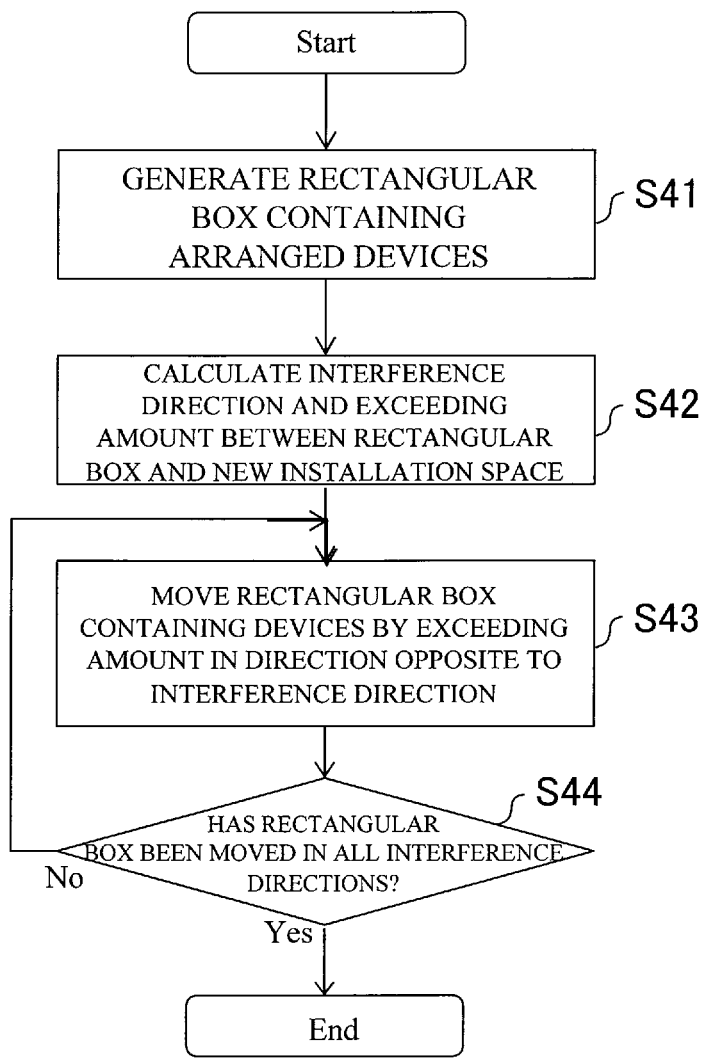
FIG. 15 is a flowchart for illustrating an operation example of interference avoidance processing.

FIG. 15 is a flowchart for illustrating an operation example of the interference avoidance processing. First, the interference handling unit 15 generates a rectangular box containing the devices arranged by the device arrangement calculation unit 14 (Step S41).

Next, the interference handling unit 15 calculates an interference direction and an exceeding amount between the rectangular box generated in Step S41 and the new installation space (Step S42).

Next, the interference handling unit 15 moves the rectangular box containing the devices by the exceeding amount in a direction opposite to the interference direction (Step S43).

For example, assuming that the rectangular box containing the devices (generated in Step S41) has an exceeding amount of "+0.1" [m] in the x-axis direction with respect to the new installation space, the interference handling unit 15 moves the rectangular box containing the devices by "−0.1" [m] in the x-axis direction.

Next, the interference handling unit 15 determines whether or not the rectangular box has been moved in all the interference directions calculated in Step S42 (Step S44). For example, when the rectangular box interferes with the new installation space in the x-axis direction and in the y-axis direction, the interference handling unit 15 determines whether or not the rectangular box has been moved in the x-axis direction and in the y-axis direction.

When determining that the rectangular box has not been moved in all the interference directions calculated in Step S42 ("No" in Step S44), the interference handling unit 15 moves to the processing of Step S43. When determining that the rectangular box has been moved in all the interference directions calculated in Step S42 ("Yes" in Step S44), the interference handling unit 15 ends the processing of this flowchart.

After the interference handling unit 15 ends the processing of this flowchart, the interference handling unit 15 moves to the processing of Step S17 of FIG. 7. Then, the interference handling unit 15 determines whether or not the rectangular box moved in Step S43 interferes with the new installation space (Step S17). When determining that the rectangular box moved in Step S43 interferes with the new installation space ("Yes" in Step S17), the interference handling unit 15 moves to the processing of Step S14 (processing of flowchart of FIG. 12). Then, the device arrangement calculation unit 14 selects a device arrangement rule having the next highest priority (Step S34), and calculates the relative arrangement coordinates of devices based on the selected device arrangement rule.

FIG. 16 is a view for illustrating a change of the device arrangement rule caused by interference. An arrangement 91 illustrated in FIG. 16 represents the arrangement of the devices A, B, C, and E based on the device arrangement rules having the device arrangement rule Nos. "AB-1", "AC-1", and "AE-3". The device C is arranged in the −x direction with respect to the device A in accordance with the device arrangement rule having the device arrangement rule No. "AC-1" (refer to FIG. 13 and FIG. 14). A broken line 91a indicates the new installation space.

An arrangement 92 represents the arrangement of the devices A, B, C, and E based on the device arrangement rules having the device arrangement rule Nos. "AB-1", "AC-2", and "AE-3". The device C is arranged in the +y direction with respect to the device A in accordance with the device arrangement rule having the device arrangement rule No. "AC-2" (refer to FIG. 13 and FIG. 14). A broken line 92a indicates the new installation space.

Now, it is assumed that the rectangular box containing the devices A, B, C, and E represented by the arrangement 91 interferes with the new installation space indicated by the broken line 91a even after the interference avoidance processing of Step S43 of FIG. 15. For example, it is assumed that the device C in the arrangement 91 interferes with the new installation space.

In this case, the device arrangement calculation unit 14 changes the device arrangement rule to be applied to the device C from the device arrangement rule having the device arrangement rule No. "AC-1" with the highest priority (p=1) to the device arrangement rule having the device arrangement rule No. "AC-2" with the next highest priority (p=2) (refer to Step S34 of FIG. 9). Because of this, the arrangement of the device C is changed from the arrangement represented by the arrangement 91 to the arrangement represented by the arrangement 92. Then, when the rectangular box containing the devices A, B, C, and E does not interfere with the new installation space by virtue of the arrangement represented by the arrangement 92, the arrangement 92 of the devices A, B, C, and E is established.

Figure 17:
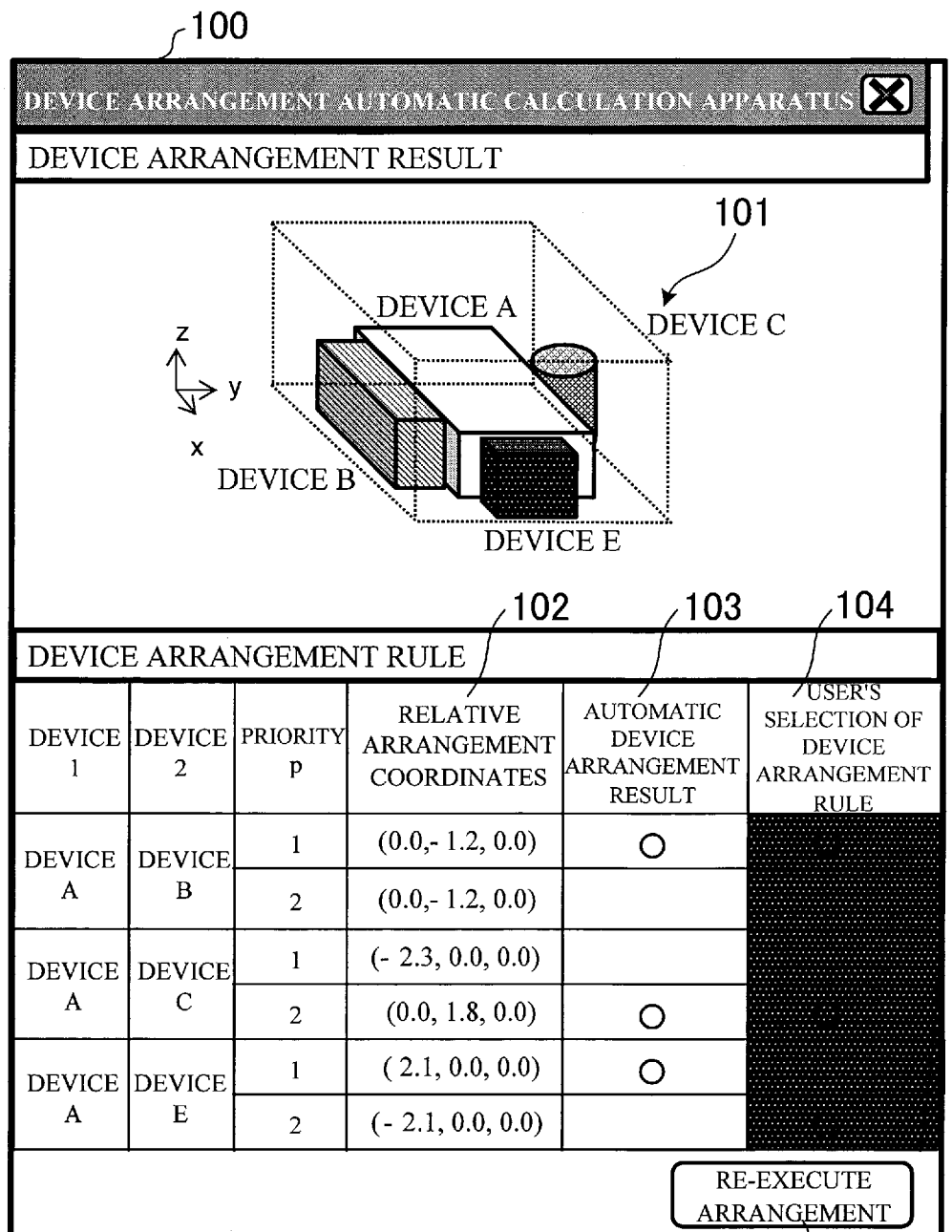
FIG. 17 is a diagram for illustrating an example of a screen displayed by a display unit 17 on a display device.

FIG. 17 is a diagram for illustrating an example of a screen displayed by the display unit 17 on a display device. The display unit 17 displays the arrangement result of devices calculated by the device arrangement calculation unit 14 on the display device. A screen 100 of FIG. 17 is an example of a screen displayed on the display device by the display unit 17.

The display unit 17 displays the arrangement result of the devices A, B, C, and E for which the user issues a new arrangement request on the display device as illustrated in a device arrangement result 101 on the screen 100. The broken line in the device arrangement result 101 indicates the new installation space.

Further, the display unit 17 displays the relative arrangement coordinates of the devices A, B, C, and E on the display device as shown in relative arrangement coordinates 102 on the screen 100.

Note that, the display unit 17 may display, on the display device, all the relative arrangement coordinates for the device arrangement rules extracted by the device arrangement rule extraction unit 12 as shown in the relative arrangement coordinates 102 on the screen 100. For example, the device arrangement calculation unit 14 may calculate the relative arrangement coordinates of the device A and the device B based on the device arrangement rule with a priority of "2", and display the coordinates on the display device as illustrated in FIG. 17.

Further, the display unit 17 displays specific device arrangement rules that are applied to arrange devices on the display device as shown in an automatic device arrangement result 103 on the screen 100. For example, in the case of the example of FIG. 17, there are two device arrangement rules about the device A and the device C, and the display unit 17 displays, on the display device, the fact that the device arrangement rule with a priority of "2" is applied to arrange the device A and the device C.

Further, the display unit 17 displays an interface for receiving a device arrangement rule to be applied to a device arrangement from the user as shown in a user's selection 104 of the device arrangement rule on the screen 100. The user can select a device arrangement rule desired to be applied to the device arrangement from among the user's selections 104 of the device arrangement rule.

For example, in the case of the example of FIG. 17, the device arrangement calculation unit 14 applies the device arrangement rule with a priority of "1" to the arrangement of the device A and the device E. However, the device arrangement calculation unit 14 can apply the device arrangement rule with a priority of "2" to arrange the devices A, B, C, and E in response to the instruction from the user.

Specifically, when the input unit 16 receives an input of a button 105 from the user, the input unit 16 receives information set in the user's selection 104 of the device arrangement rule (device arrangement rule designated by user). The device arrangement calculation unit 14 selects device arrangement rules received by the input unit 16 from the user from among the device arrangement rules extracted by the device arrangement rule extraction unit 12 (from among six device arrangement rules illustrated in FIG. 17), and re-execute the arrangement of the devices A, B, C, and E.

Figure 18:
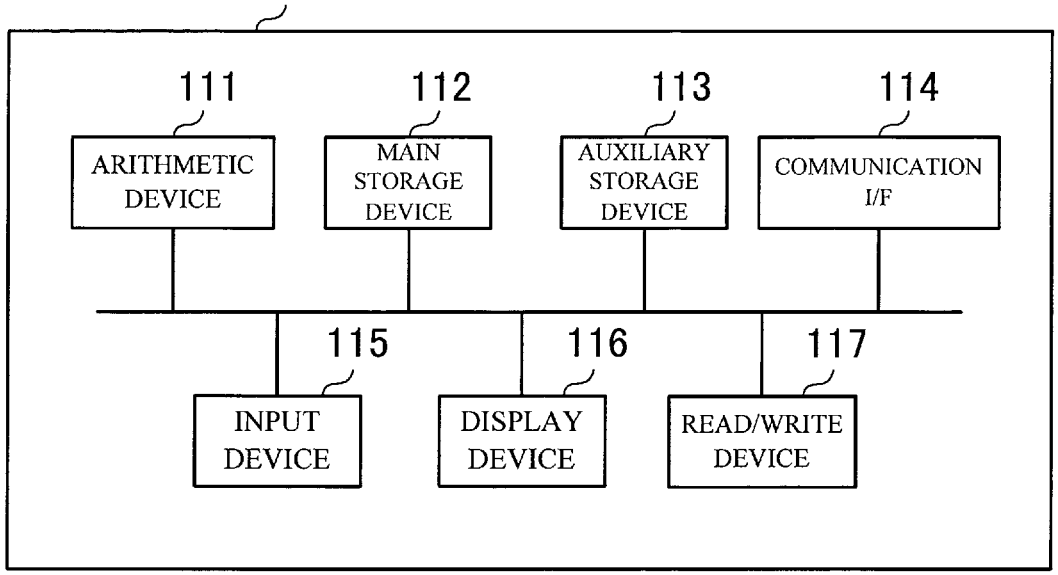
FIG. 18 is a diagram for illustrating a hardware configuration example of the device arrangement apparatus 1.

FIG. 18 is a diagram for illustrating a hardware configuration example of the device arrangement apparatus 1. The device arrangement apparatus 1 can be realized by a computer including: an arithmetic device 111, such as a central processing unit (CPU); a main storage device 112, such as a random access memory (RAM); an auxiliary storage device 113, such as a hard disk drive (HDD); a communication interface (I/F) 114 for connecting to a communication network in a wired or wireless manner; an input device 115, such as a mouse, a keyboard, a touch sensor, or a touch panel; a display device 116, such as a liquid-crystal display; and a read/write device 117 for reading and writing information from/to a portable storage medium, such as a digital versatile disc (DVD), those components being illustrated in FIG. 18 as an example.

For example, the functions of the respective units illustrated in FIG. 1 are realized by the arithmetic device 111 executing a predetermined program loaded onto the main storage device 112 from the auxiliary storage device 113 or the like. The input unit 16 is realized by, for example, the arithmetic device 111 utilizing the input device 115. The display unit 17 is realized by, for example, the arithmetic device 111 utilizing the display device 116. Further, the storage units illustrated in FIG. 1 and a storage unit not illustrated in FIG. 1 are realized by, for example, the arithmetic device 111 utilizing the main storage device 112 or the auxiliary storage device 113.

Note that, the above-mentioned predetermined program may be installed from a storage medium read by the read/write device 117 or may be installed from a network via the communication I/F 114.

As described above, the device arrangement rule generation unit 11 of the device arrangement apparatus 1 refers to the actual arrangement data storage unit 18 storing past arrangement data of devices to generate device arrangement rules each including the past installation space of devices and the relative direction information indicating the relative direction between devices that were arranged in that past installation space. The input unit 16 inputs information on the new installation space and the devices to be arranged in that new installation space, which is received from the user. The device arrangement rule extraction unit 12 extracts device arrangement rules each including a pair of devices among the devices to be arranged in the new installation space, which are input by the input unit 16, from among the device arrangement rules generated by the device arrangement rule generation unit 11. The device arrangement calculation unit 14 calculates the arrangement positions of the devices to be arranged in the new installation space based on the relative direction information included in the device arrangement rules extracted by the device arrangement rule extraction unit 12 and the dimensions of the devices to be arranged in the new installation space input by the input unit 16.

With this, the device arrangement apparatus 1 arranges the devices based on the device arrangement rules generated from the past arrangement data of devices without the user inputting the constraint condition for the device arrangement, and hence the user's labor can be saved.

Further, the device arrangement rule includes the relative direction information indicating not the relative positional relationship between the devices but the relative direction between the devices. In addition, the device arrangement calculation unit 14 calculates the arrangement position of the devices based on the relative direction information and the dimensions of the devices to be arranged newly. With this, the device arrangement apparatus 1 can arrange the devices even when the shapes of the devices to be arranged newly are changed.

Further, the device arrangement calculation unit 14 selects a device arrangement rule from among the device arrangement rules extracted by the device arrangement rule extraction unit 12 based on similarity degrees calculated by the similarity degree calculation unit 13. With this, a device arrangement rule that is similar to the new installation space for which the user issues a new arrangement request is selected, and hence the occurrence of interference between the devices and the new installation space can be suppressed.

Further, when the interference handling unit 15 determines that at least one of the devices and the new installation space interfere with each other, the device arrangement calculation unit selects a device arrangement rule having the next highest similarity degree and then arranges the devices. With this, the device arrangement apparatus 1 can calculate the device arrangement that does not interfere with the new installation space.

Note that, in the above description, the similarity degree calculation unit 13 calculates the similarity degree between the installation space of a device arrangement rule and the new installation space based on the similarity degree between diagonal vectors, but the calculation of the similarity degree is not limited thereto. For example, the similarity degree calculation unit 13 may calculate the similarity degree based on characteristics of the installation space and the new installation space.

Further, the installation space and the new installation space are described as being rectangular boxes for the simplicity of description, but the shapes of the installation space and the new installation space are not limited thereto. For example, the installation space and the new installation space may have actual shapes.

Further, the shape generated in the processing of Step S41 of FIG. 15 is also not limited to the rectangular box. For example, the interference handling unit 15 may generate a three-dimensional region surrounded by outer peripheral surfaces of all the devices.

The present invention is not limited to the embodiment described above and covers various modification examples. For instance, the embodiment described above is a detailed description written for an easy understanding of the present invention, and the present invention is not necessarily limited to a configuration that includes all of the described components. The configuration of one embodiment may partially be replaced by the configuration of another embodiment. The configuration of one embodiment may be joined by the configuration of another embodiment. In each embodiment, a part of the configuration of the embodiment may have another configuration added thereto or removed therefrom, or may be replaced by another configuration.

Some of or all of the configurations, functions, processing units, processing means, and the like described above may be implemented by hardware by, for example, designing those as an integrated circuit. The configurations, functions, and the like described above may be implemented by software through a processor's interpretation and execution of programs for implementing the respective functions. The programs for implementing the functions and information such as tables and files can be put in a memory, in a recording device such as a hard disk or a solid state drive (SSD), or in a storage medium such as an IC card, an SD card, or a DVD. The present invention can be provided also as a device arrangement method to be performed by the device arrangement apparatus 1, as a program for implementing the device arrangement method, and as a storage medium having the program stored thereon.

What is claimed is:

1. A device arrangement apparatus, comprising:
    an actual arrangement data storage unit configured to store past arrangement data of power source or air conditioning devices in a building;
    a device arrangement rule generation unit configured to generate, by referring to the actual arrangement data storage unit, device arrangement rules each including a past installation space of the power source or air conditioning devices and relative direction information indicating a relative direction between the power source or air conditioning devices that were arranged in the past installation space;
    an input unit configured to input information on a new installation space and current power source or air conditioning devices to be arranged in the new installation space, which is received from a user;
    a device arrangement rule extraction unit configured to extract, from among the device arrangement rules generated by the device arrangement rule generation unit, device arrangement rules each including a pair of the current power source or air conditioning devices among the current power source or air conditioning devices to be arranged in the new installation space input by the input unit; and
    a device arrangement calculation unit configured to calculate an arrangement position of the pair of the current power source or air conditioning devices among the current power source or air conditioning devices to be arranged in the new installation space based on relative direction information included in one of the device arrangement rules extracted by the device arrangement rule extraction unit and based on dimensions of the pair of the current power source or air conditioning devices among the current power source or air conditioning devices to be arranged in the new installation space input by the input unit.

2. A device arrangement apparatus according to claim 1, further comprising a similarity degree calculation unit configured to calculate similarity degrees between the new installation space input by the input unit and installation spaces included in the device arrangement rules extracted by the device arrangement rule extraction unit,
    wherein the device arrangement calculation unit is further configured to select a device arrangement rule having a highest similarity degree from among the device arrangement rules extracted by the device arrangement rule extraction unit, and calculate an arrangement position of a pair of current power source or air conditioning devices among the current power source or air conditioning devices to be arranged in the new installation space based on relative direction information included in the selected device arrangement rule and dimensions of the pair of current power source or air conditioning devices among the current power source or air conditioning devices to be arranged in the new installation space input by the input unit.

3. A device arrangement apparatus according to claim 2, further comprising an interference handling unit configured to determine whether or not any one of the current power source or air conditioning devices that have arrangement positions calculated by the device arrangement calculation unit and the new installation space input by the input unit interfere with each other.

4. A device arrangement apparatus according to claim 3, wherein the device arrangement calculation unit is further configured to select a device arrangement rule having a next highest similarity degree when the interference handling unit determines that one of the current power source or air conditioning devices that have the arrangement positions calculated by the device arrangement calculation unit and the new installation space input by the input unit interfere with each other.

5. A device arrangement apparatus according to claim 1, further comprising a display unit configured to output to a display device an arrangement result of the current power source or air conditioning devices that have the arrangement positions calculated by the device arrangement calculation unit.

6. A device arrangement apparatus according to claim 1,
   wherein the input unit is further configured to input a device arrangement rule received from the user, and
   wherein the device arrangement calculation unit is further configured to select the device arrangement rule input by the input unit from among the device arrangement rules extracted by the device arrangement rule extraction unit, and calculate an arrangement position of a pair of the current power source or air conditioning devices among the current power source or air conditioning devices to be arranged in the new installation space based on relative direction information included in the selected device arrangement rule and dimensions of the pair of the current power source or air conditioning devices among the current power source or air conditioning devices to be arranged in the new installation space input by the input unit.

7. A device arrangement apparatus according to claim 1, wherein the relative direction information is represented by a unit vector indicating the relative direction between the power source or air conditioning devices that were arranged in the past installation space.

8. A device arrangement method to be performed by a device arrangement apparatus, the device arrangement method comprising:
   storing past arrangement data of power source or air conditioning devices in a building;
   generating, by the device arrangement apparatus, by referring to an actual arrangement data storage unit storing past arrangement data of a device, device arrangement rules each including a past installation space of the power source or air conditioning devices and relative direction information indicating a relative direction between the power source or air conditioning devices that were arranged in the past installation space;
   inputting, by the device arrangement apparatus, information on a new installation space and current power source or air conditioning devices to be arranged in the new installation space, which is received from a user;
   extracting, by the device arrangement apparatus, from among the device arrangement rules generated in the generating of the device arrangement rules, device arrangement rules each including a pair of the current power source or air conditioning devices among the current power source or air conditioning devices to be arranged in the new installation space input in the inputting; and
   calculating, by the device arrangement apparatus, an arrangement position of the pair of the current power source or air conditioning devices among the current power source or air conditioning devices to be arranged in the new installation space based on relative direction information included in one of the device arrangement rules extracted in the extracting of the device arrangement rules and based on dimensions of the pair of the current power source or air conditioning devices among the current power source or air conditioning devices to be arranged in the new installation space input in the inputting.

* * * * *